United States Patent
Best et al.

(10) Patent No.: US 12,502,168 B2
(45) Date of Patent: Dec. 23, 2025

(54) KNOTLESS METHODS AND CONSTRUCTS FOR TISSUE REPAIRS AND RECONSTRUCTIONS

(71) Applicant: Arthrex, Inc., Naples, FL (US)

(72) Inventors: Joshua Best, Naples, FL (US);
Zachary Ingwer, Naples, FL (US);
Tara L Swanlaw, Fort Myers, FL (US);
Colin Baker, Naples, FL (US); Tyler Esposito, Fort Myers, FL (US);
Andrew K. Osika, Naples, FL (US);
Justin M Boyle, Naples, FL (US);
Jacob A. Jolly, Naples, FL (US)

(73) Assignee: Arthrex, Inc., Naples, FL (US)

( * ) Notice: Subject to any disclaimer, the term of this patent is extended or adjusted under 35 U.S.C. 154(b) by 367 days.

(21) Appl. No.: 17/781,082

(22) PCT Filed: Dec. 31, 2020

(86) PCT No.: PCT/US2020/067627
§ 371 (c)(1),
(2) Date: May 31, 2022

(87) PCT Pub. No.: WO2021/138536
PCT Pub. Date: Jul. 8, 2021

(65) Prior Publication Data
US 2023/0000481 A1    Jan. 5, 2023

Related U.S. Application Data

(60) Provisional application No. 62/955,624, filed on Dec. 31, 2019.

(51) Int. Cl.
*A61B 17/04* (2006.01)
*A61F 2/08* (2006.01)

(52) U.S. Cl.
CPC ........ *A61B 17/0401* (2013.01); *A61F 2/0811* (2013.01); *A61B 2017/0458* (2013.01);
(Continued)

(58) Field of Classification Search
CPC ........ A61B 17/0401; A61B 2017/0458; A61B 2017/0464; A61F 2/0811; A61F 2210/0004
See application file for complete search history.

(56) References Cited

U.S. PATENT DOCUMENTS 9,642,661 B2 *   5/2017   Stone ................... A61B 17/823
10,675,073 B2 *  6/2020   Stone ................... A61B 17/842
(Continued)

FOREIGN PATENT DOCUMENTS

EP          2777613 B1     9/2014

OTHER PUBLICATIONS

Partial European Search Report for European Application No. 20909916.7 dated Jan. 4, 2024.
(Continued)

*Primary Examiner* — Tan-Uyen T Ho
*Assistant Examiner* — Cherie M Poland
(74) *Attorney, Agent, or Firm* — Potomac Law Group, PLLC

(57) ABSTRACT

Surgical constructs, assemblies, and methods for tissue reinforcement with a reinforcement (reinforcing) material.

5 Claims, 23 Drawing Sheets

(52) U.S. Cl.
CPC ............... *A61B 2017/0464* (2013.01); *A61F 2210/0004* (2013.01)

(56) References Cited

U.S. PATENT DOCUMENTS

| | | | |
|---|---|---|---|
| 2013/0096612 A1* | 4/2013 | Zajac | ............... A61B 17/0469 |
| | | | 606/232 |
| 2013/0116730 A1 | 5/2013 | Denham et al. | |
| 2014/0088655 A1* | 3/2014 | Stone | ............... A61B 17/842 |
| | | | 606/328 |
| 2016/0008123 A1 | 1/2016 | Woodruff et al. | |
| 2016/0175088 A1 | 6/2016 | Sengun | |
| 2016/0183936 A1 | 6/2016 | Spenciner | |
| 2016/0354195 A1 | 12/2016 | Spenciner | |
| 2017/0049432 A1 | 2/2017 | Dooney et al. | |
| 2017/0049434 A1 | 2/2017 | Dooney et al. | |
| 2018/0055507 A1 | 3/2018 | Bachmaier et al. | |
| 2018/0193132 A1 | 7/2018 | Spenciner | |
| 2018/0221133 A1 | 8/2018 | Lund | |
| 2018/0360440 A1* | 12/2018 | Guerra | ............... A61F 2/08 |
| 2019/0314143 A1 | 10/2019 | Jackson et al. | |

OTHER PUBLICATIONS

International Search Report and Written Opinion dated Mar. 30, 2021, issued in International Application No. PCT/US2020/067627.
Extended European Search Report for European Application No. 20909916.7 dated May 7, 2024.

* cited by examiner

KNOTLESS METHODS AND CONSTRUCTS FOR TISSUE REPAIRS AND RECONSTRUCTIONS

CROSS-REFERENCE TO RELATED APPLICATIONS

This application is a U.S. national stage filing under 35 U.S.C. § 371 of International Application No. PCT/US2020/067627 filed Dec. 31, 2020, which claims priority to and the benefit of U.S. Provisional Patent Application No. 62/955,624 filed Dec. 31, 2019, all of which are hereby incorporated by reference in their entireties.

BACKGROUND

The disclosure relates to the field of surgery and, more specifically, to surgical constructs and tissue repairs for reconstructive surgeries.

SUMMARY

Knotless, self-locking, tensionable surgical constructs and methods of tissue repairs are disclosed.

A surgical construct can include a reinforcement material with a self-locking mechanism. A self-locking mechanism can include at least one eyelet attached to a flexible coupler and secured to a reinforcement material, to form at least one splice located partially or totally within a surgical construct. A splice can be formed with a shuttle/pull device. A surgical construct can be provided with holes or eyelets to facilitate suture passes through a reinforcement material. A surgical construct can be knotless, self-locking, tensionable, self-cinching.

Methods of knotless, self-locking, tensionable tissue repairs are also disclosed. A surgical construct provides self-locking, self-cinching, knotless soft tissue to bone fixation, without knot formation, with fewer passing steps, increased fixation, and uniform soft tissue compression.

DETAILED DESCRIPTION

Figure 1:
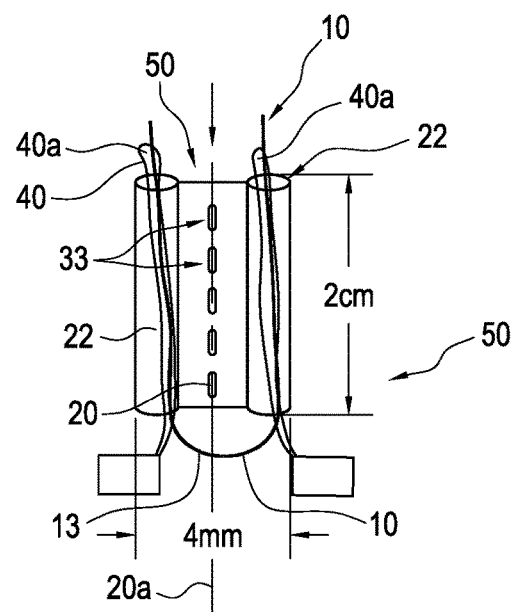
FIG. 1 illustrates a surgical construct according to an exemplary embodiment.

The disclosure provides knotless, self-locking, tensionable surgical systems, assemblies, constructs, and methods for tissue repairs and reconstructions, employing tissue reinforced with a reinforcement (reinforcing) material such as suture, tape, weave, or mesh, among many others. The tissue can be any biological construct (for example, graft, ligament, or tendon) that is employed for repairing a tendon or ligament, or similar anatomical structure. The reinforced tissue can be attached to any fixation device(s) and/or to any bone tunnel(s) or similar structures.

A surgical construct can include a reinforcement material, a flexible coupler attached to the reinforcement material, and at least one eyelet. The eyelet allows the flexible coupler to form a knotless, tensionable, self-locking, adjustable loop and a splice, to lock the flexible coupler after proper graft suturing is completed (self-locking mechanism). The reinforcement material can be suture tape. The flexible coupler can be suture. The eyelet can be a shuttle/pull device, or part of a shuttle/pull device. The construct can be provided with holes or eyelets to facilitate suture passes through the reinforcement material with a suture passing instrument such as a needle. Additional fixation devices such as strands, anchors, buttons, implants, screws, plates, or suture loop/button constructs, among many others, can be attached to the flexible coupler and/or reinforcement material. A surgical construct can be knotless, self-locking, tensionable, adjustable, self-cinching.

A surgical assembly or surgical system can include a reinforcement material with a self-locking mechanism or tensionable construct (including an eyelet secured to a flexible coupler) and a fixation device attached to the reinforcement material. The fixation device can be an anchor, button, implant, screw, plate, suture loop/button construct, or combinations thereof. The fixation device can be a suspensory fixation device, such as TightRope® Attachable Button System (ABS), ACL TightRope® construct, or other button/suture loop constructs. The surgical assembly or system can be knotless, tensionable, self-locking, self-cinching.

A reinforced tissue construct can include a stitched region formed by employing (1) a piece of material; and (2) at least one self-locking flexible coupler attached to the piece of material and to an eyelet, the flexible coupler forming at least one locking splice after graft attachment is completed. The piece of material can be attached/affixed to at least a portion of tissue (graft, ligament, or tendon) to reinforce the tissue. The material can be any reinforcement or reinforcing material such as suture, tape, weave, ribbon, textile, or mesh that can be attached (sutured) to the tissue. The material can be attached to the tissue by suturing (for example, stitching such as whipstitching) or by any other affixing/attachment techniques, to provide additional fixation when implanted. The reinforced tissue (graft, ligament, or tendon) construct can be attached to additional fixation devices for various repairs such as ACL/PCL, Achilles, biceps, meniscus, labrum, patella, single limb, multi limb, cervical cerclage, wound closure, and joint capsule repairs and reconstructions, among many others. The reinforced tissue construct can be knotless, self-locking, tensionable.

Methods of forming knotless, self-locking, tensionable, reinforced tissue constructs having increased pull-out strength as well as methods of securing such tissue constructs in bone tunnels or sockets are also disclosed. An exemplary method of forming a knotless, self-locking, tensionable, reinforced tissue construct (reinforced biologic construct) comprises: (i) suturing or stitching tissue to a reinforcement material with at least one flexible coupler; and (ii) locking the at least one flexible coupler to the reinforcement material in a knotless manner. The locking can include forming a splice. The locking can include forming two or more splices with ends/limbs of the flexible coupler. The splice can be formed with a shuttle/pull device. The splice can be housed partially or totally within the reinforcement material. The reinforcement material can be a flat overbraided middle suture tape section with two longitudinal open lumens that protect and house splices that are used to lock the sutures after proper tissue suturing is completed. The reinforced construct can be attached to one or more fixation devices (for example, ACL Tightrope®, BTB Tightrope®, ABS Tightrope®, or other suture loop/button constructs) and/or any bone tunnel.

The surgical constructs provide simplified, knotless, self-locking, tensionable suturing systems and attachment of grafts, tendons, or ligaments to fixation devices using suturing techniques such as the "rip-stop" suturing technique, without knot formation and faster tissue reduction with a stronger and more reproducible repair. The surgical constructs can be provided as stand-alone surgical constructs, or they can be provided already attached to one or more fixation devices, for example, one or more implantable buttons, or may be subsequently attached to one or more fixation devices. The surgical constructs provide self-locking, knotless soft tissue to bone fixation, without knot formation, with fewer passing steps, increased fixation and uniform soft tissue compression.

Referring now to the drawings, where like elements are designated by like reference numerals, FIGS. 1-33 illustrate exemplary surgical constructs 50, 150, 250, 350, 450, 550; surgical assemblies 101, 102, 103; and methods of forming reinforced tissue construct 99 with such surgical constructs and assemblies. Surgical constructs 50, 150, 250, 350, 450, 550; surgical assemblies 101, 102, 103; and reinforced tissue construct 99 can be knotless, self-locking, tensionable, self-cinching.

FIG. 1 illustrates exemplary surgical construct 50 which includes material 20, flexible coupler 10, and at least one eyelet 40a attached to the flexible coupler 10 and/or material 20. Material 20 may be any reinforcement/reinforcing material that can be attached (sutured) to tissue (tendon/graft/ligament). In an embodiment, material 20 can be suture, tape, weave, fabric, ribbon, textile, web, or mesh, or any combinations of these materials. Material 20 can be braided or multi-filament suture such as FiberTape® suture tape (as disclosed in U.S. Pat. No. 7,892,256, the disclosure of which is incorporated in its entirety herewith) or collagen tape, or combinations thereof. Material 20 can be bioabsorbable such that it will resorb away after a period of time in the body, or may be provided with various medicinal or therapeutic agents, for example, antiseptics, antibiotics, drugs, pharmaceutical agents, hormones, and growth materials (for example, autogenous growth factors such as platelet-rich plasma (PRP) or autologous-conditioned plasma (ACP), autologous factors), among many others).

Material 20 can have any shape and geometry that provides reinforcement to the tissue to be sutured. For example, and according to an embodiment, material 20 is a suture tape with a rectangular configuration (as shown in FIG. 1) with a length of about 2 cm and a width of about 4 mm, or any configuration as long as it provides a surface area on which suturing/stitching may be conducted. The material can be provided in any length/width and then cut depending upon the configuration and geometry of the tissue to be reinforced. For example, material 20 can be formed by providing a FiberTape® suture tape and then laser cutting it into sections of about 2 cm after braiding.

Eyelet 40a can be part of a shuttle/pull device 40 that can be pre-loaded onto the material 20. The shuttle/pull device 40 can be attached to material 20 by various methods known in the art, such as threading or weaving of the shuttle/pull device (attached to flexible coupler 10) multiple times through each of longitudinal sides of the material 20. The shuttle/pull device 40 can be also housed partially or totally within a channel or lumen of the material 20, for example, within lumen or channel 22. FIG. 1 illustrates construct 50 formed of an exemplary 2 cm length of FiberTape® 20 integral with two lumens 22 or channels 22 extending longitudinally relative to material 20 and on opposing sides. Material 20 is flanked by two exemplary open ended lumens 22 extending along a longitudinal axis 20a of the material 20, each housing one or more shuttle/pull devices 40 with flexible coupler 10. In an exemplary embodiment, each channel 22 houses one shuttle/pull device 40 along a portion of flexible coupler 10.

Shuttle/pull device 40 (shuttling device 40; suture threader 40; suture passer 40; shuttle stitch 40; suture passing instrument 40) can be an exemplary FiberLink™ or Nitinol loop, or any similar suture passing instrument with a closed loop or eyelet 40a, to allow passing of flexible coupler therethrough and aid in the formation of a splice 44 as part of knotless, self-locking, tensionable mechanism 144, and as detailed below. Exemplary construct 50 includes two shuttle/pull devices 40 in the form of sliding shuttle stitches (for example, two #2 TigerTail® sutures) each loaded onto one of the two lumens 22 and extending in same direction. Each sliding shuttle suture 40 is provided with shuttling loop 40a (eyelet or closed loop 40a) to load the flexible coupler 10 (repair stich 10 or suture 10) and pass it through the lumen to form a splice. The suture limbs 10a, 10b of flexible coupler 10 will lock after tissue suturing is completed.

Channels 22 (lumens 22; open-ended lumens 22) can be formed integral with material 20 or attached to it by any method known in the art. For example, channels 22 can be formed integral with the material 20 by folding the material 20 (tape 20) over its longitudinal edges and stitching the edges to form two channels, i.e., converting portions of flat suture tape to round structures (such as round sutures or coreless sutures without a core). Channels 22 can be also formed separately and subsequently attached to material 20 by any known attachment method in the art. For example, channels 22 can be provided as two coreless sutures (for example, two separate round coreless sutures) that are attached to material 20 by gluing, bonding, weaving, etc.

Construct 50 of FIG. 1 can be provided with one or more optional through-holes, openings, bifurcations, or eyelets 33 used for needle passing and/or suturing. Eyelets 33 are provided within the body of the material 20, at symmetrical or non-symmetrical positions. Eyelets 33 can have various forms and geometries, for example, round through-holes of about 1 mm each, and spaced apart from each other by about 4 mm, to allow a needle (or other suture passing instrument) with flexible coupler 10 to pass therethrough and aid in formation of suture passes, as detailed below. Eyelets 33 can be reinforced around the perimeter of the holes/eyelets by threading around the opening, much like that of a button hole of a garment, to form reinforced eyelets 33. Eyelets 33 provided along the length of the flat suture tape 20 permit for the shuttling of other sutures (flexible couplers or strands) through the tape so as to provide "shuttling" eyelets. Eyelets 33 can also be used to attach additional strands of suture to permit additional compression of a suture construct created at a repair site, such as a reinforced ACL graft. Eyelets 33 in the suture tape also facilitate improved healing at the repair site, permitting collagen ingrowth through the eyelets (or other growth/repair material through the eyelets).

FIG. 1 also illustrates exemplary loop 13 of flexible coupler 10 which allows attachment of one or more fixation devices (such as fixation device 60, 160) to form knotless, self-locking, tensionable surgical assembly 101, 102, 103 with a knotless, self-locking, tensionable mechanism 144, as detailed below.

Figure 2:
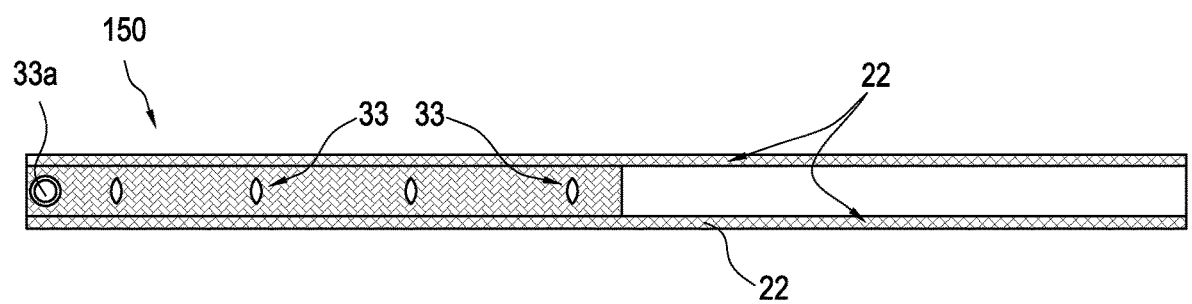
FIG. 2 illustrates a surgical construct according to another exemplary embodiment.
Figure 3:
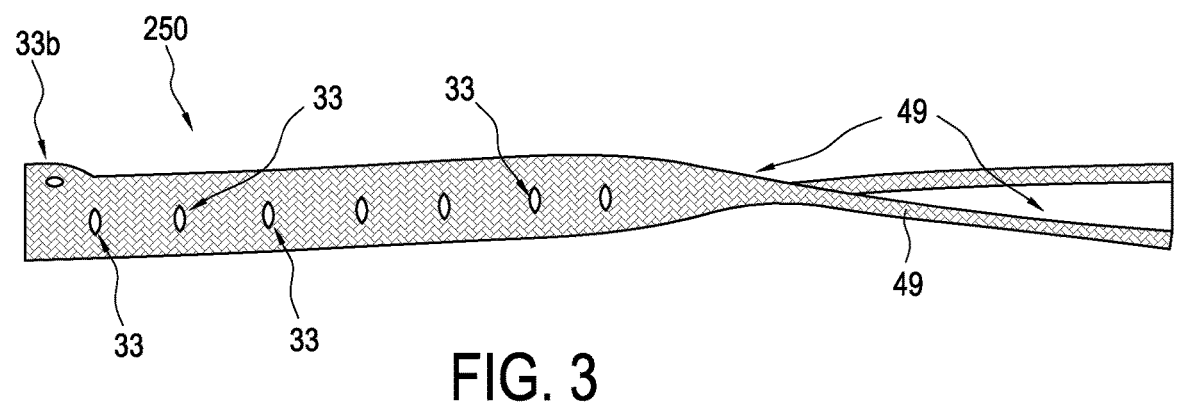
FIG. 3 illustrates a surgical construct according to another exemplary embodiment.
Figure 4:
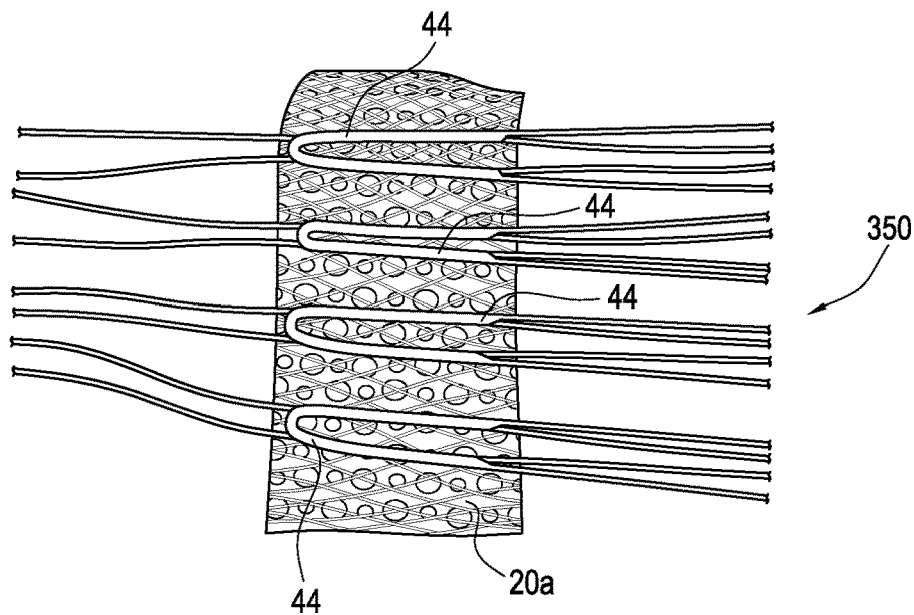
FIG. 4 illustrates a surgical construct according to another exemplary embodiment.

FIGS. 2 and 3 illustrate exemplary surgical constructs 150, 250 of the present disclosure which are about similar to construct 50 above, but differ in that surgical construct 150 is a coreless, bifurcated, double lumen construct (FiberTag™ construct) with a plurality of eyelets 33 and a larger eyelet 33a to hold a fixation device, such as TightRope® ACL construct. The small eyelets or holes 33 are spaced about every 3 to 5 mm, to facilitate suture passes through the material (tag) with a needle. The FiberTag™ 150 can convert two coreless round sutures 22. The round lengths are approximately 20 cm each. The overall length of the material 20 (FiberTag™ 20) is about 2 cm.

Surgical construct 250 of FIG. 3 is also a coreless, bifurcated FiberTag™ construct with small holes or eyelets 33 spaced every 3 to 5 mm, to facilitate suture passes through the material 20 with a needle or similar suture passer. The small holes or eyelets may be of about 1 mm in size. The tape is folded over and stitched back on itself, leaving an opening 33b where a fixation device (for example, a TightRope® device) can be loaded. The FiberTag™ construct converts two round sutures 49 to a flat structure. The tape portion is about 40 mm long and then convert to round. The round lengths are approximately 20 cm each. The overall length of the material 20 is about 2 cm. The position and orientation of the eyelets/holes/bifurcations 33, 33a, 33b depend on the intended use of the construct and they could be aligned in-line with the tape. The eyelets/holes/bifurcations 33, 33a, 33b are large enough to accommodate the passing of a needle.

FIGS. 4-8 illustrate surgical constructs 350, 450, 550 of the disclosure. Surgical construct 350 of FIG. 4 includes a long piece of reinforcement material 20a in the form of a large mesh or tape that has four exemplary locking splices 44 extending along the material. Reinforcement material 20a may be provided with any number of locking splices as part of a knotless, self-locking, tensionable mechanism (tensionable construct). Surgical construct 350 of FIG. 4 can be employed for wound closure and can be optionally used with additional biologics such as various medicinal or therapeutic agents, for example, antiseptics, antibiotics, drugs, pharmaceutical agents, hormones, and growth materials (for example, autogenous growth factors such as platelet-rich plasma (PRP), autologous factors), among many others).

Figure 5:
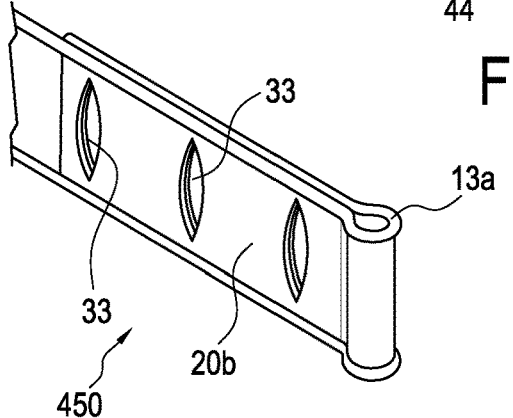
FIG. 5 illustrates a perspective view of a surgical construct according to another exemplary embodiment.
Figure 6:
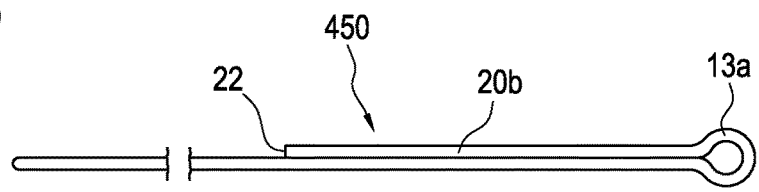
FIG. 6 illustrates a side view of the surgical construct of FIG. 5.
Figure 7:
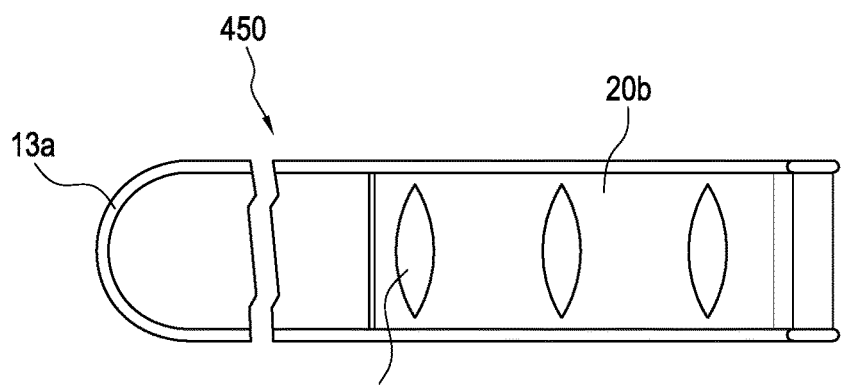
FIG. 7 illustrates a top view of the surgical construct of FIG. 5.

FIGS. 5-7 illustrate various views of surgical construct 450 which is formed of reinforcement material 20b in the shape of a long length of reinforcement material 20 (tape 20) folded over itself to form loop 13a to allow attachment of one or more fixation devices and/or flexible couplers. Construct 450 can be employed in meniscal rip stop repairs. Eyelets or openings 33 could be formed by welded embroidered webbing (lasercut webbing). Opening 13a allows attachment of one or more fixation devices, for example, a TightRope® construct.

Figure 8:
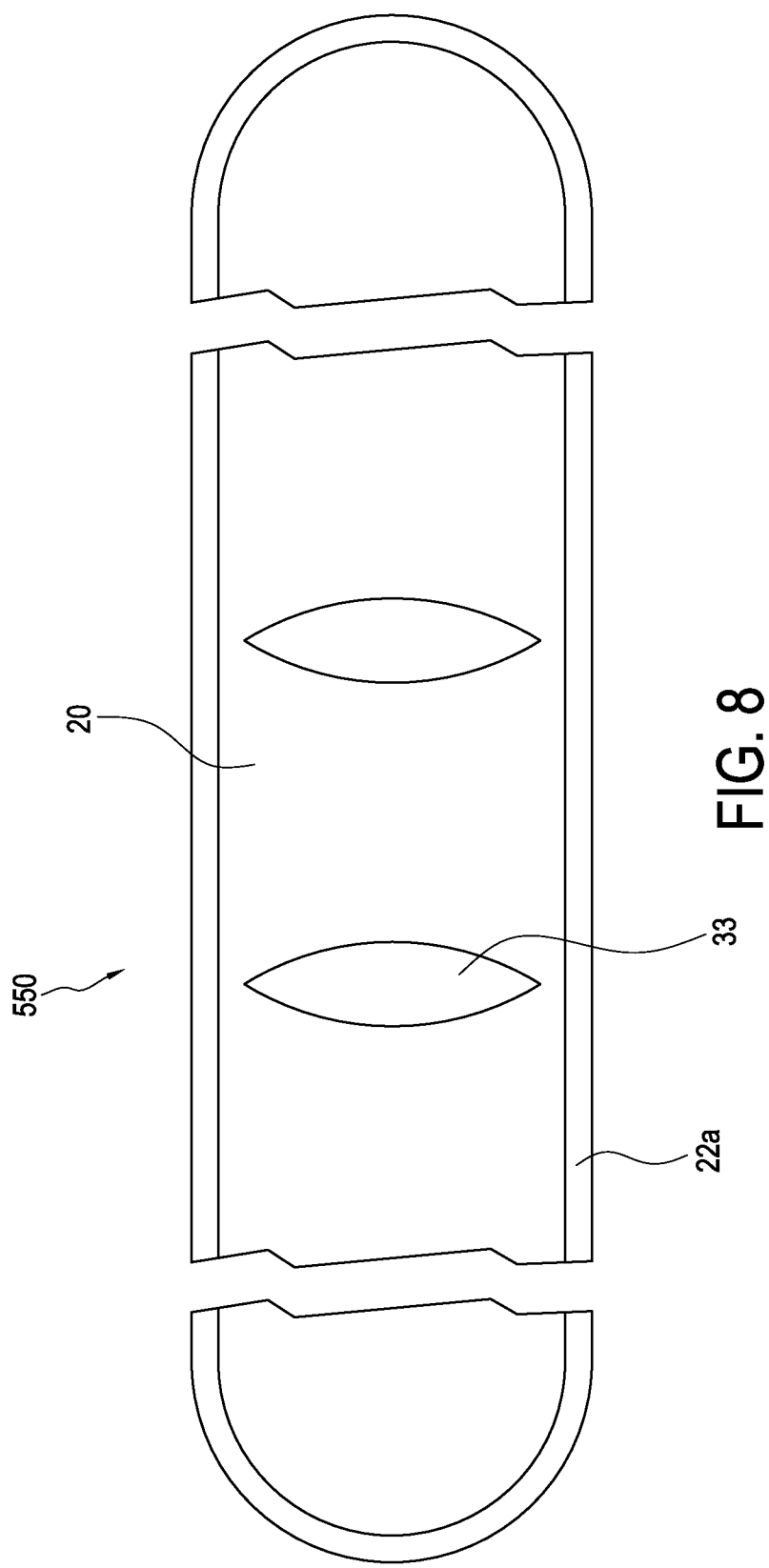
FIG. 8 illustrates a top view of a surgical construct according to another exemplary embodiment.

FIG. 8 illustrates surgical construct 550 with double lumen 22a extending along a length of reinforcement material 20 and on each of opposing sides, for example, the longitudinal sides of reinforcement material 20. Construct 550 can be employed in meniscal rip stop repairs. Eyelets or openings 33 could be formed by welded embroidered webbing (lasercut webbing).

Figure 9:
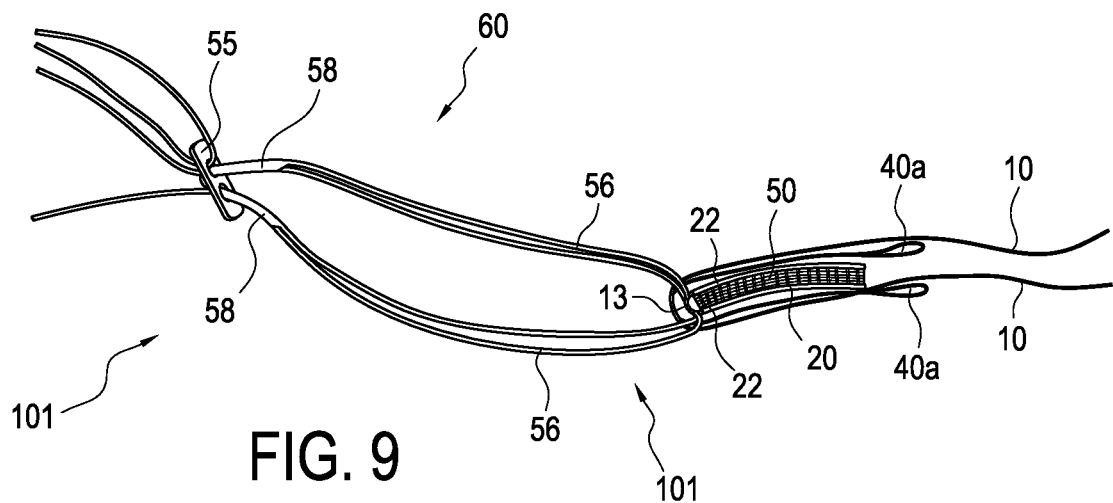
FIG. 9 illustrates a surgical assembly according to an exemplary embodiment.
Figure 10:
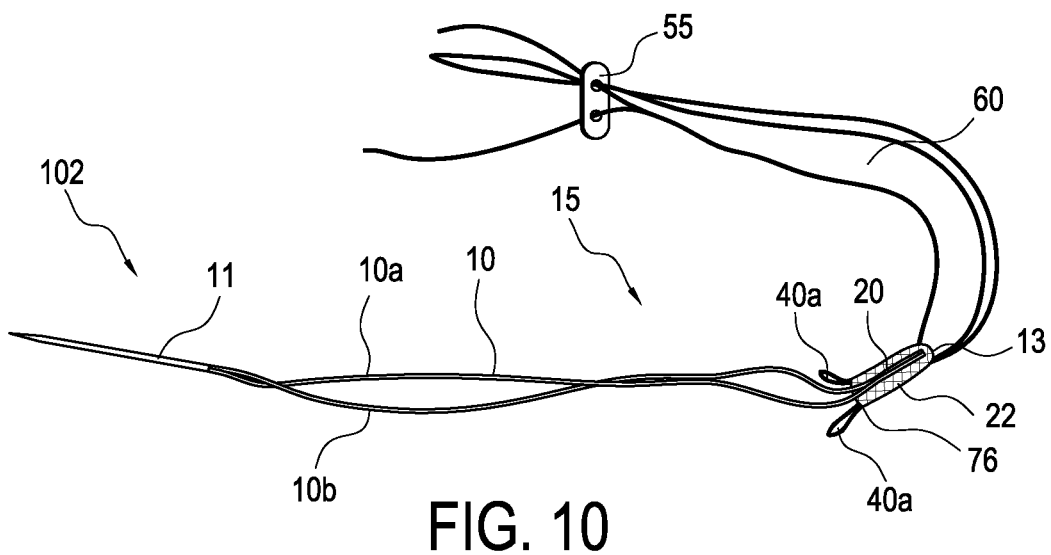
FIG. 10 illustrates a surgical assembly according to another exemplary embodiment.
Figure 11:
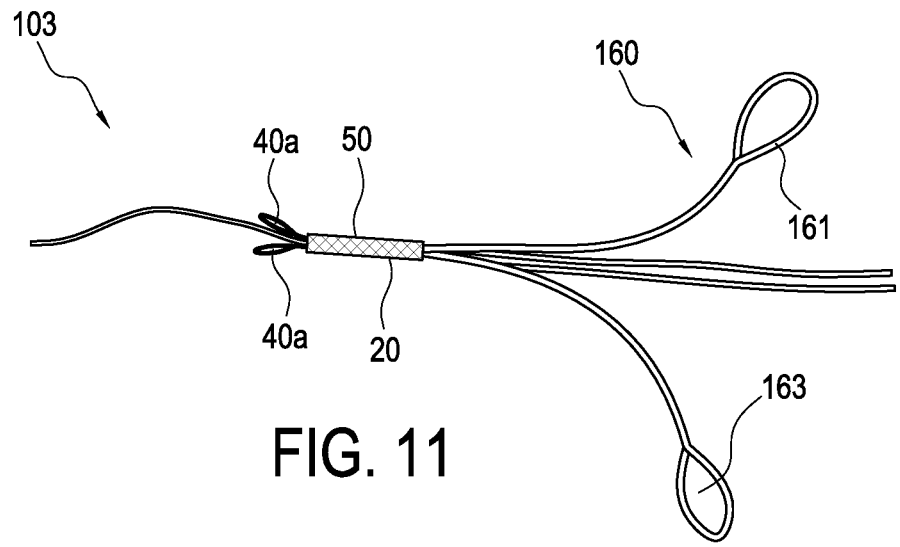
FIG. 11 illustrates a surgical assembly according to another exemplary embodiment.

FIGS. 9-11 illustrate various assemblies 101, 102, 103 formed with any of surgical constructs 50, 150, 250, 350, 450, 550 attached to various fixation devices 60, 160. The surgical construct can be provided pre-assembled to the fixation device, or the construct could be added secondarily to the fixation device. The fixation device can be attached to a loop of the flexible coupler 10 once the loop has been formed during suturing.

The fixation devices can be anchors, buttons, implants, screws, plates, or suture loop/button constructs, among many others. In an embodiment, the fixation device can be a suspensory fixation device such as an exemplary continuous loop/button construct provided with a button, preferably of titanium alloy, and a continuous loop attached to the button. The button may have an oblong configuration and a width that is preferably less than about 1 mm narrower than the width of the drill hole through which the button is inserted and subsequently passed through. The button may be provided with an inside eyelet that allows the passage of the continuous loop. In an embodiment, the suture loop may be a single high strength suture such as FiberWire® suture. In another embodiment, the continuous loop may be formed of a plurality of suture strands configured to separate from a single strand to a plurality of strands in a continuous loop. In yet another embodiment, the loop is an adjustable loop (forming a TightRope® ACL construct) which consists of two interconnected, adjustable, flexible loops formed by splicing a suture strand in a manner disclosed in U.S. Pat. No. 8,439,976 issued May 14, 2013 and U.S. Pat. No. 8,460,379 issued Jun. 11, 2013, the disclosures of both of which are incorporated by reference in their entireties herein.

In the embodiment of FIG. 9, fixation device 60 is an adjustable knotless TightRope® ACL construct 60 with a button 55 and two interconnected suture loops 56 forming two eyesplices 58, the loops being adjustable and connected to each other, and further attached to the button. Fixation device 60 is attached to loop 13 of the flexible coupler 10 once the loop has been formed, and during the stitching/suturing technique. The TightRope® ACL construct offers adjustable cortical fixation for cruciate ligament reconstruction (as a four-point knotless fixation that resists cyclic displacement and offers strong pull-out strength).

FIG. 10 illustrates assembly 102 which is about similar to assembly 101 of FIG. 9 but with a FiberLoop® suture 15 attached to surgical construct 50. Reinforcement material 20 is attached to the FiberLoop® suture 15 with needle 11 through a plurality of tails/ends 10a, 10b of flexible coupler 10, to form the assembly shown in FIG. 10. Surgical construct 50 attached to FiberLoop® suture 15 is placed over tendon/ligament/graft 80 to form a reinforced graft construct. The wide "tape like" area 20 (reinforcing material 20) of construct 50 is placed on a surface of the tendon/ligament/graft 80 and permits the surgeon to include the construct 50 into tendon/ligament/graft stitches. Needle 11 pierces the reinforcement material 20 (optionally through eyelet 33) and tendon 80 with the first pass.

FIG. 11 illustrates assembly 103 with surgical construct 50 attached to a double-loaded FiberTak™ anchor 160 which is a soft anchor or an "all-suture" anchor. Soft anchor 160 (soft suture anchor 160; all-suture soft knotless anchor 160) is provided with a soft anchor sleeve (sheath or tubular member) with two open ends, and at least two flexible shuttling strands 161, 163 extending through the soft anchor sleeve (sheath). The flexible strands may extend through the sleeve in similar or different directions and/or orientations and/or locations. The flexible tubular sleeve with the shuttling strands may be secured into or onto bone, and flexible strands may pass over soft tissue and are secured into bone to approximate soft tissue to bone. Details of an exemplary soft suture anchor with a soft anchor sleeve (sheath or tubular member) and flexible shuttling strands are set forth, for example, in U.S. application Ser. No. 15/998,516 entitled "Methods of Tissue Repairs" filed Aug. 16, 2018, the disclosure of which is incorporated by reference in its entirety herein.

FIGS. 12-19 illustrate steps of a tissue repair to form reinforced tissue construct 99 with exemplary surgical constructs 50, 150, 250, 350, 450, 550. Material 20 is secured to tissue 80 by stitching, for example, with the flexible coupler 10 to form reinforced construct 99 with stitching pattern 77. The graft 80 and the FiberTape® construct 20 can be stitched together with the FiberLoop® suture 15.

Figure 12:
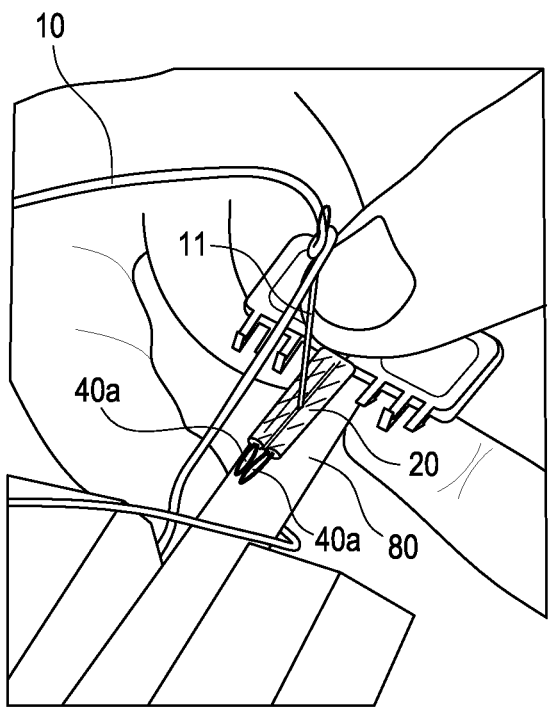
FIGS. 12-14 illustrate steps of a tissue repair.
Figure 13:
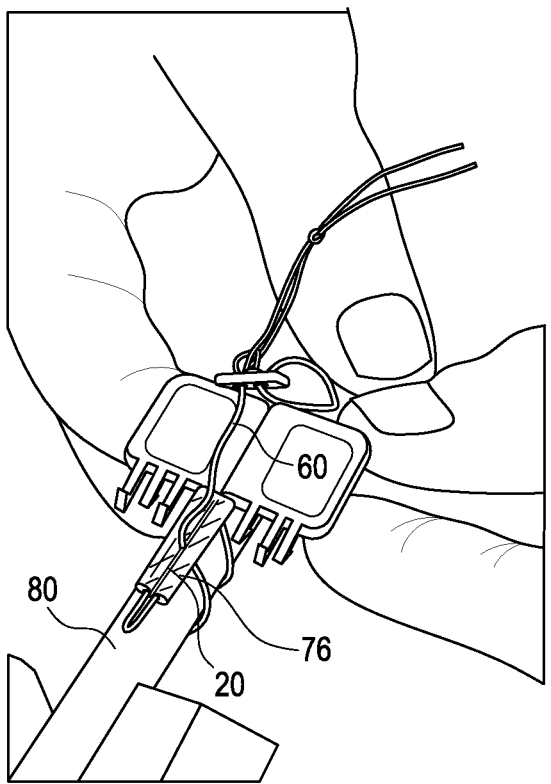
Figure 19:
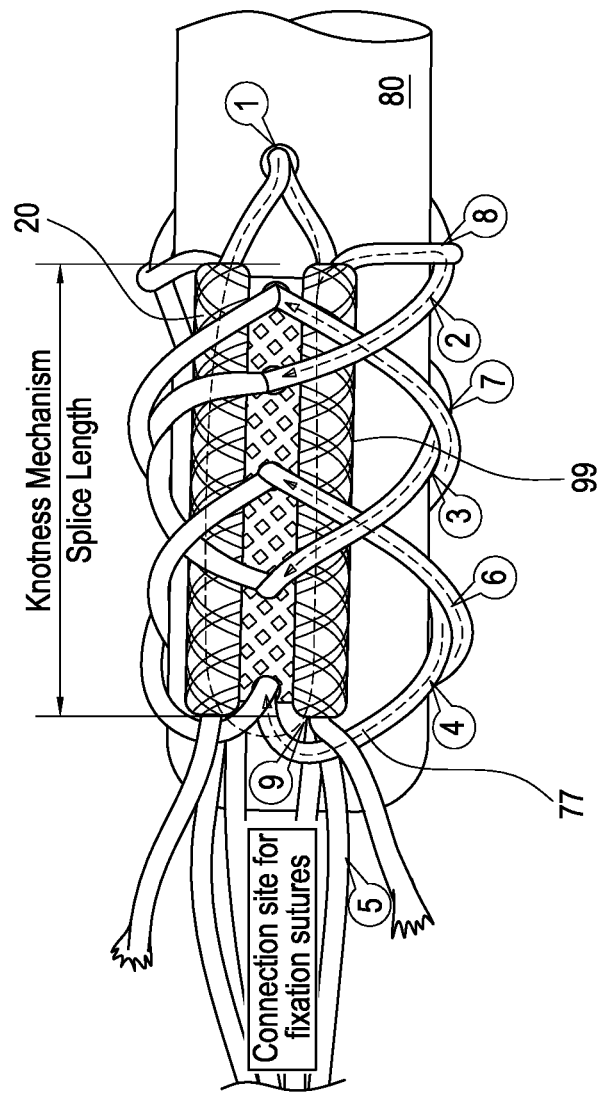

FIG. 12 illustrates surgical construct 50 with two eyelets 40a of two shuttle/pull devices 40 and material 20 disposed over tissue 80 (for example, graft, tendon, ligament, or any soft tissue). The distal aspect of material 20 is aligned with the distal aspect of the graft 80 and held in place with a clamp (for example, an Alice clamp). A complete first stitch is shown in FIG. 13 and the final soft tissue construct 99 reinforced with material 20 and exemplary suturing pattern 77 (rip-stop pattern 77) is shown in FIG. 19. FIG. 13 also illustrates fixation device 60 attached to reinforcement material 20, once loop 13 has been formed by flexible coupler 10 (at the end of material 20 opposite to the end where the loops 40a of shuttle/pull devices 40 exit the material 20).

Figure 14:
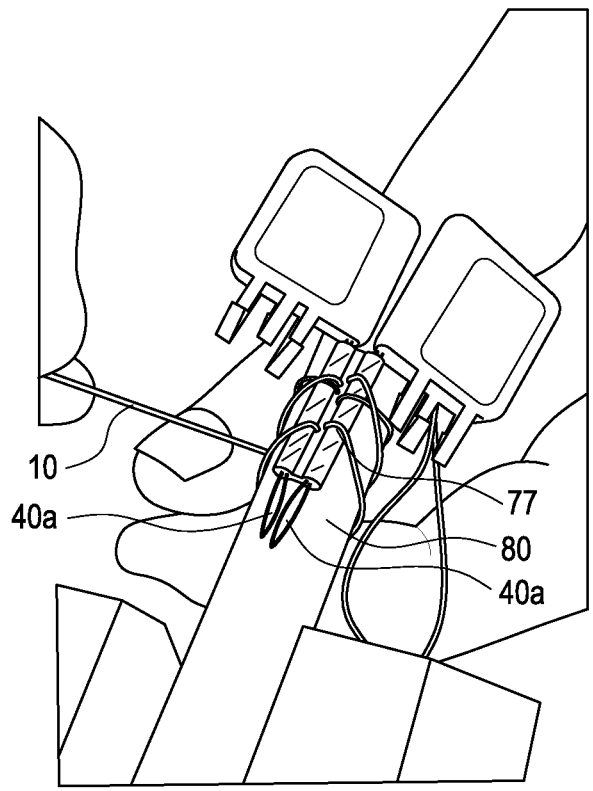
Figure 15:
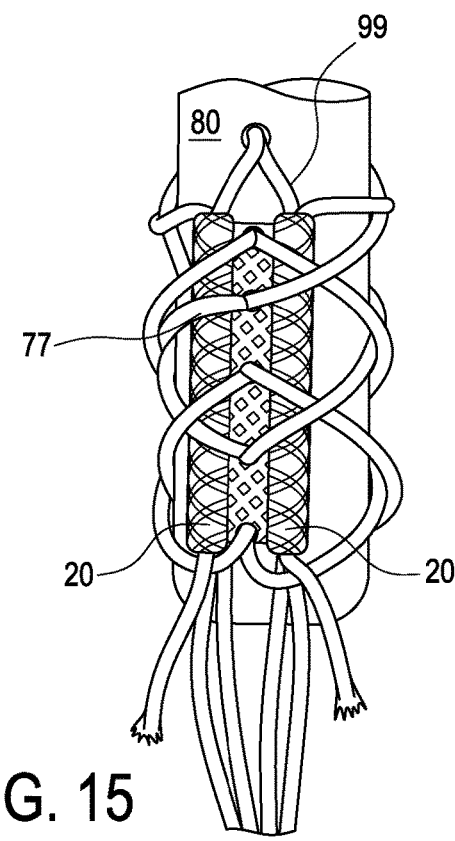
FIGS. 15-19 illustrates various views of a reinforced tissue construct.
Figure 16:
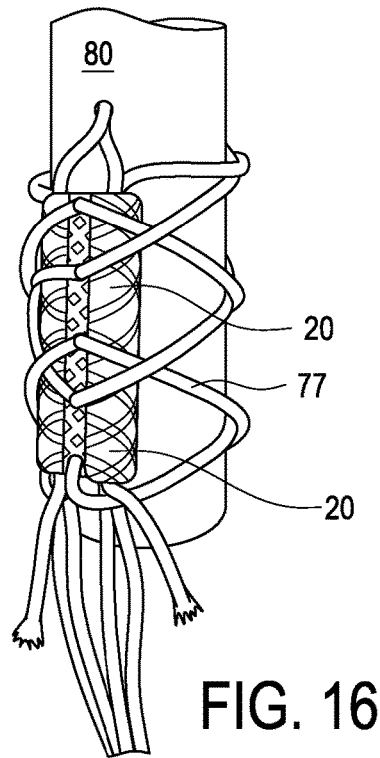
Figure 17:
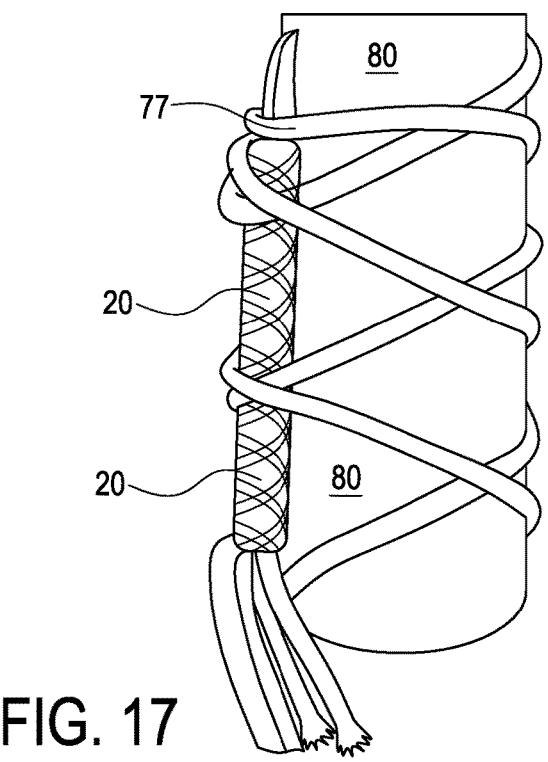
Figure 18:
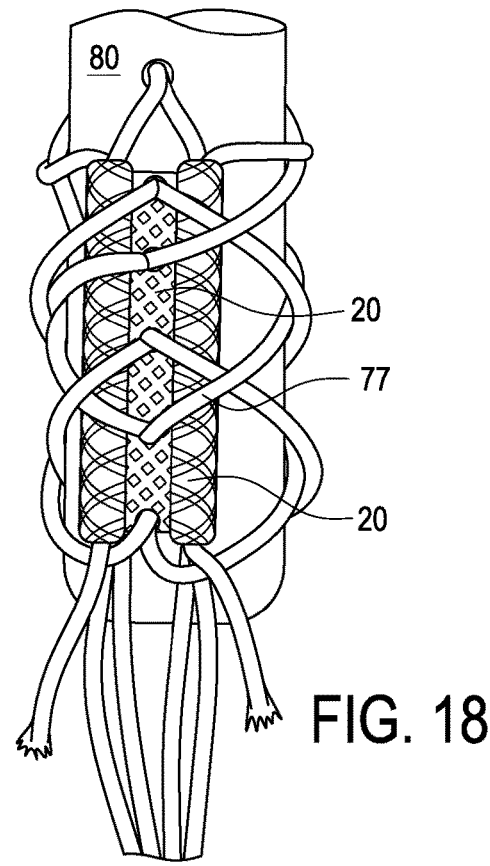

FIGS. 13 and 14 show secure attachment of the reinforcement material 20 of surgical construct 50 to the graft 80 by, for example, stitching (for example, whipstitching) the graft with a flexible coupler 10 (for example, a flexible strand such as suture). With each step, needle 11 attached to flexible coupler 10 passes through eyelets 33 (or pierces the material 20 if there are no eyelets) through the tissue 80, and back through the eyelets or material 20, for multiple times.

In an embodiment, stitching can be conducted with a continuous suture loop with a free floating needle attached to it (such as FiberLoop® system 15). Details of a method of stitching with a continuous suture loop with a free floating needle attached to it (such as FiberLoop® system) are set forth in U.S. Pat. No. 8,298,284, the entire disclosure of which is incorporated by reference in its entirety herewith. As detailed in U.S. Pat. No. 8,298,284, the suture loop/free floating needle construct includes a flexible coupler 10 forming a continuous loop of suture, preferably a continuous loop of #2 FiberWire® suture with both ends attached to a free floating thin needle 11 (such as a thin Nitinol needle). The thin needle 11 is preferably straight and easy to handle, without instruments. The needle 11 moves freely on the suture loop to recenter itself after passing through tissue and to facilitate even tensioning. The free floating needle 11 is not swaged on the suture loop so, after passing the suture loop construct through the tissue to be treated, the needle may be recentered if the suture strands are uneven. In other embodiments, needle 11 may be a thin Nitinol needle with either a curved or straight configuration, which may be crimped or swaged on the flexible strand 10.

FIG. 14 illustrates how the FiberLoop® suture is passed through surgical construct 50 and tissue 80 without having to double-back, to form exemplary reinforced graft construct 99 (FIGS. 15-19). During rip-stop suturing, the reinforcement material 20 is pierced twice, i.e., the suturing goes twice in one direction (for example, down direction) for two sections down, and then the suturing continues in an opposite direction (for example, up direction) to form a crossover pattern and stitched section/region 77 formed of a plurality of suture passes/loops 76.

FIG. 19 illustrates a sequence of passes numbered 1-9 to form a specific rip-stop stitching configuration 77 (suturing or stitching pattern 77) with the surgical constructs of the present disclosure. The suturing begins at insertion point 1 and skips one sequential eyelet 33 to point 2, then skips another sequential eyelet to point 3, and so on, all conducted in one direction (first direction). FIG. 19 represents only four points of the specific stitching configuration 77 going in the first direction; however, the disclosure is not limited to this exemplary-only embodiment and has applicability to any number of insertion points along the length of material 20, depending on the intended application. In return, the surgeon proceeds with same suturing pattern but in an opposite direction (second direction) and skipping in a similar manner (i.e., at points 6, 7, 8), however, skipping the eyelets that have been penetrated/sutured through in the first direction. By going up and down (or in a first direction and a second opposite direction), the rip-stop pattern 77 has a cross-over configuration which provides additional uniform tissue compression and increased pull-out resistance of the reinforced graft construct.

After the last pass, each limb of flexible coupler 10 is loaded onto the loop 40a of each shuttle/pull device 40 and then pulled back to form a knotless, closed loop with an adjustable perimeter and splice 44 within each channel 22, to lock the construct. This allows for a much stronger construct and without knots tied with the remaining suture limbs, once the graft or tendon has been stitched. Reinforced tissue construct 99 (graft construct 99) of FIGS. 15-19 includes splices 44 extending within channels 22 of reinforcement material 20 and a stitched section/region 77 formed of a plurality of suture passes/loops 76 of flexible coupler 10. The length of the knotless mechanism splice is illustrated in FIG. 19 as the distance between point 8 and point 9.

FIGS. 20-32 illustrate sequential schematic steps of a rip-stop repair according to another embodiment.

Figure 20:
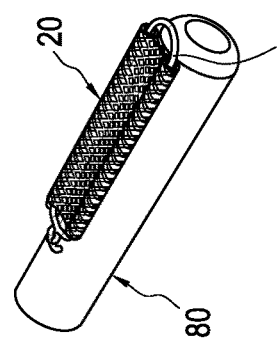
FIGS. 20-32 illustrate steps of a rip-stop repair.

FIG. 20: reinforcement material 20 (FiberTag™ construct 20) is placed on top of graft 80; needle 11 and loop 15 are attached at one end (not shown due to long length)

Figure 21:
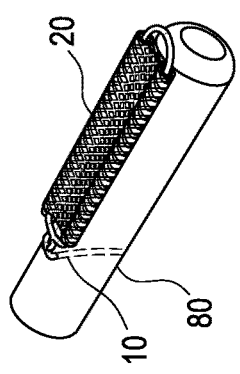

FIG. 21: suture 10 is passed through graft 80

Figure 22:
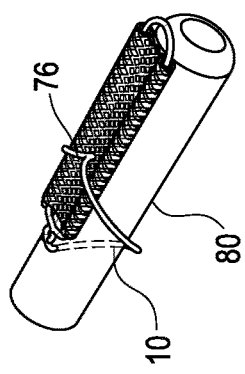

FIG. 22: suture 10 is passed around graft 80

Figure 23:
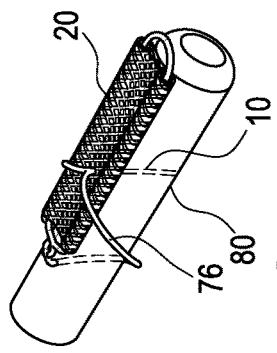

FIG. 23: suture 10 is passed through graft 80

Figure 24:
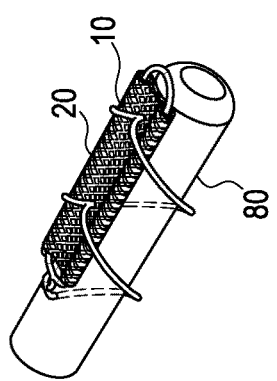

FIG. 24: suture 10 is passed around graft 80

Figure 25:
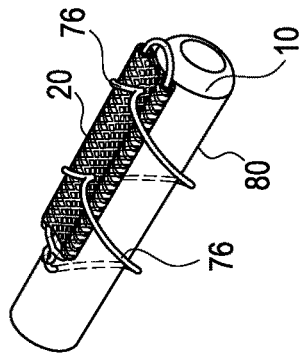

FIG. 25: suture 10 is passed through graft 80

Figure 26:
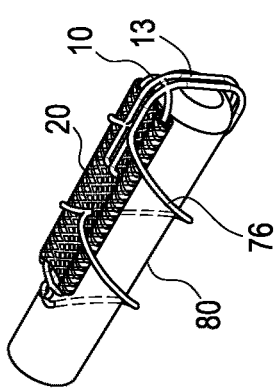

FIG. 26: suture 10 is passed in front of graft 80 and fixation device 60, 160 (for example, a TightRope® construct such as BTB TightRope®) is attached to the two loops 13

Figure 27:
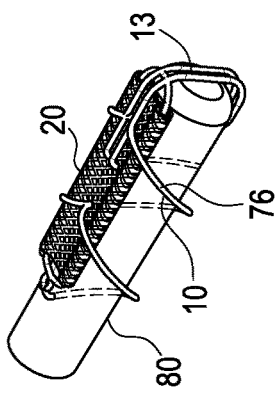

FIG. 27: suture 10 is passed through graft 80

Figure 28:
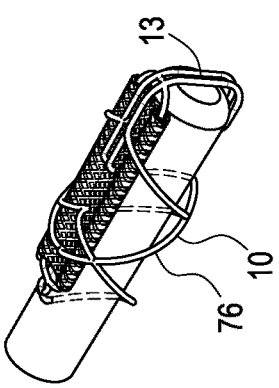

FIG. 28: suture 10 is passed around graft 80

Figure 29:
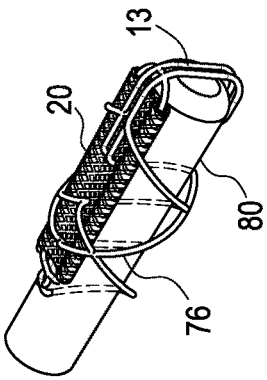

FIG. 29: suture 10 is passed through graft 80

Figure 30:
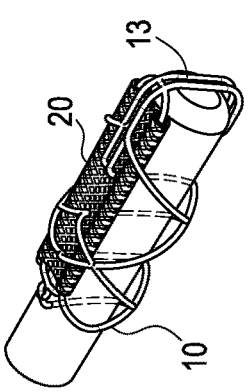

FIG. 30: suture 10 is passed around graft 80; needle 11 is removed from suture

Figure 31:
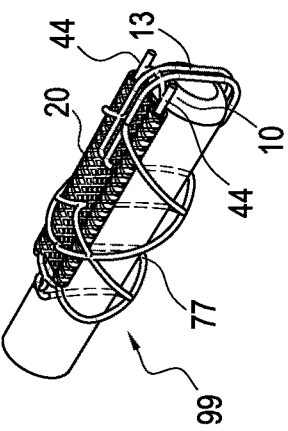
Figure 32:
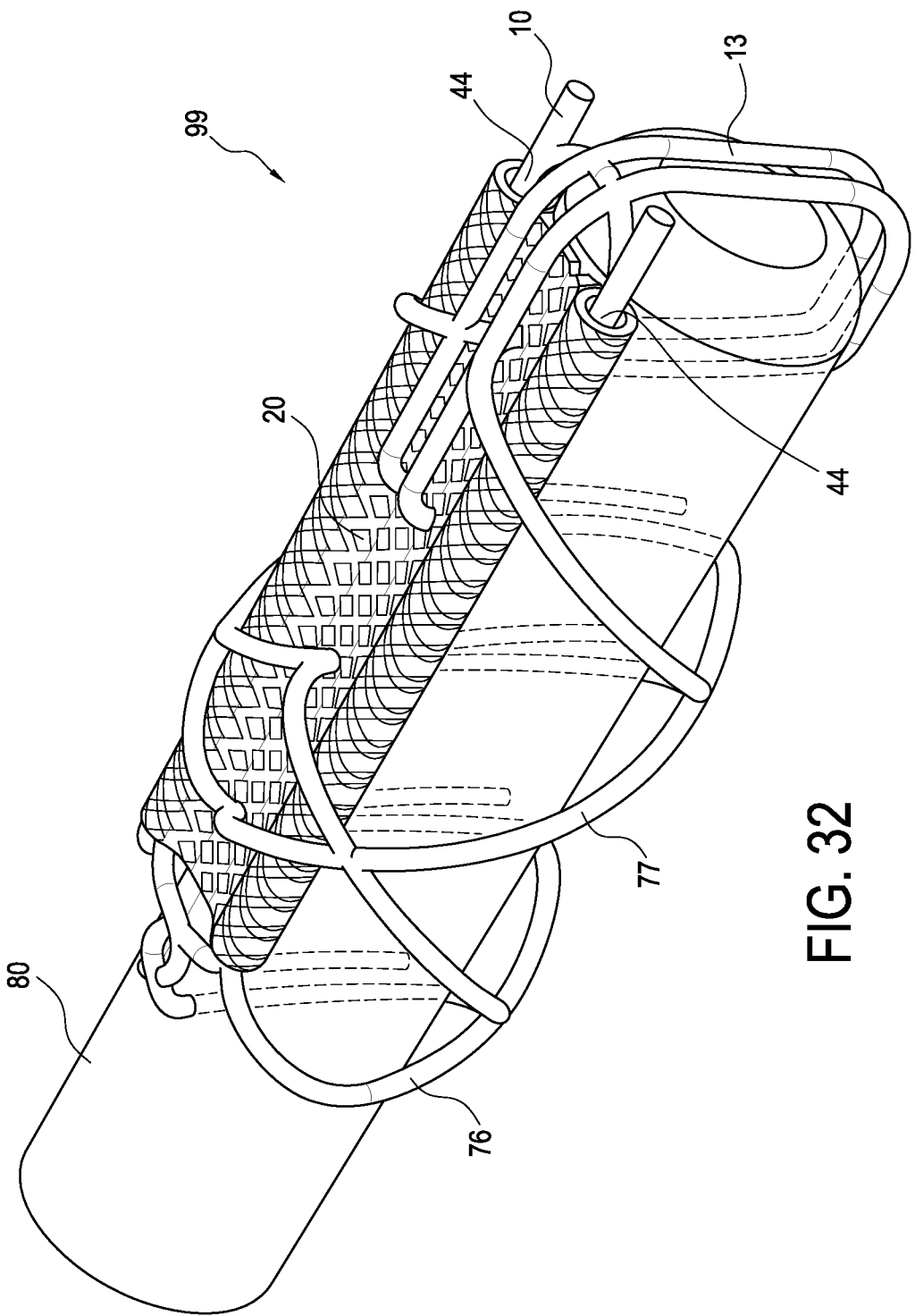

FIGS. 31 and 32: suture 10 is passed through locking splices 44

Figure 33:
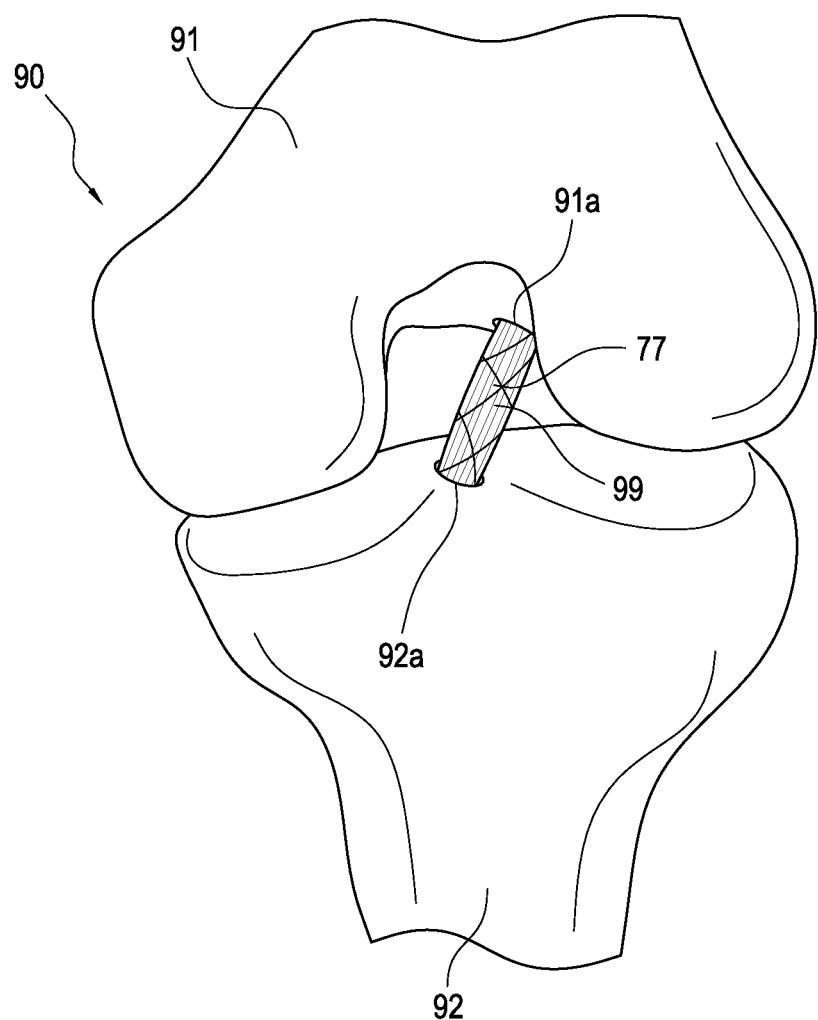
FIG. 33 illustrates a reinforced tissue construct employed in ACL reconstruction and according to an exemplary embodiment.
Figure 34:
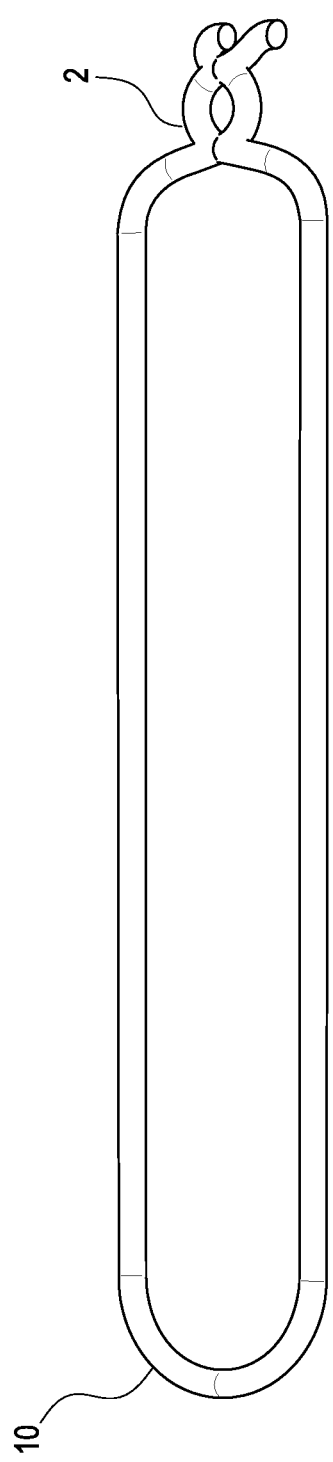
FIGS. 34-47 illustrate additional views of reinforced tissue constructs and associated methods of tissue repairs and reinforcements.
Figure 35:
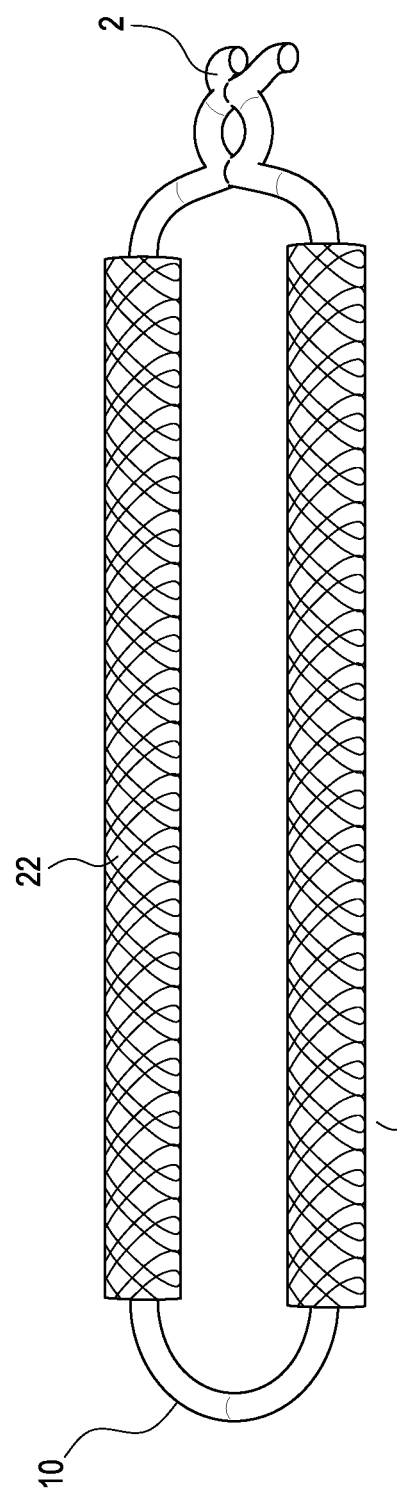
Figure 36:
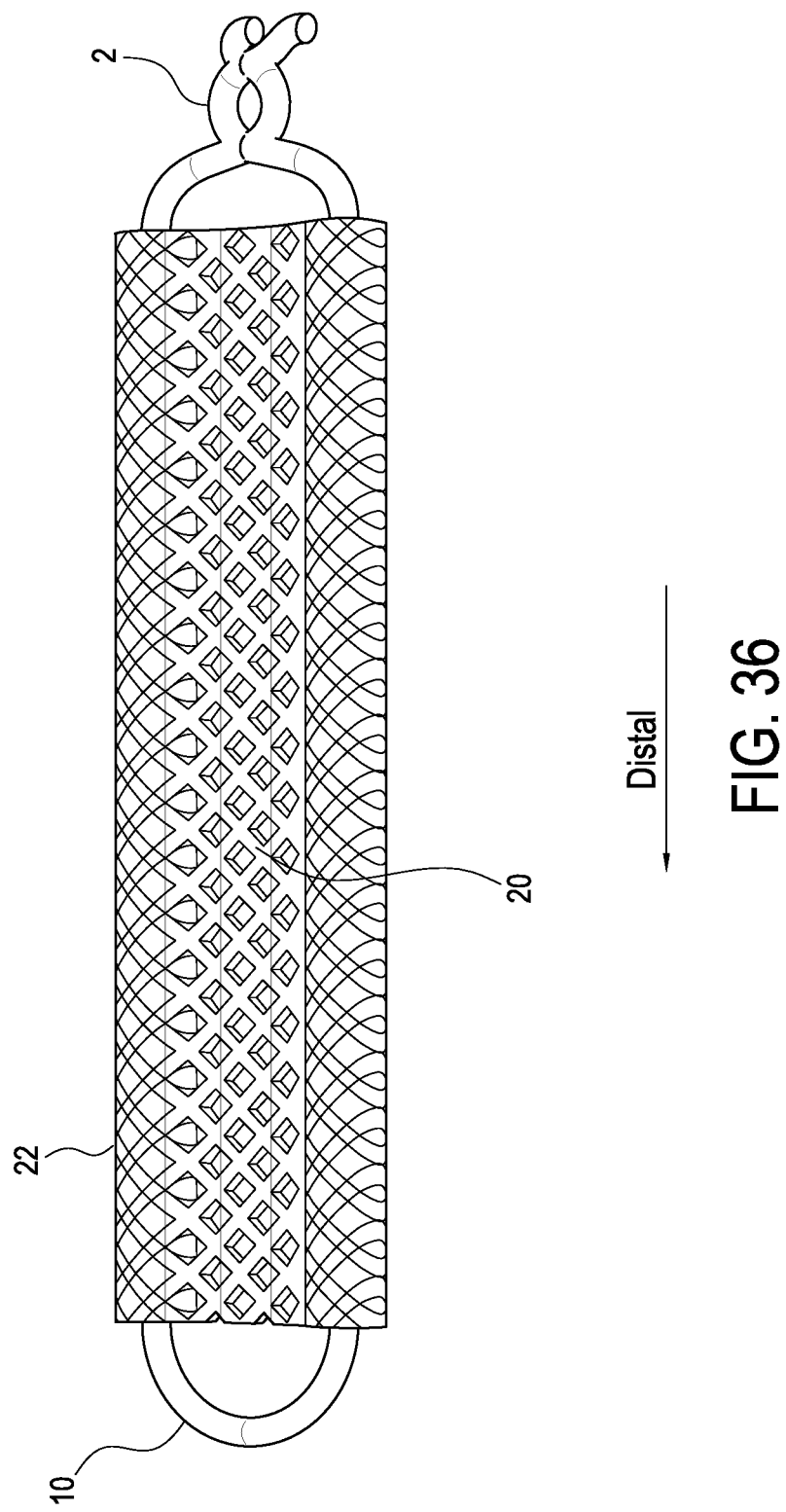
Figure 37:
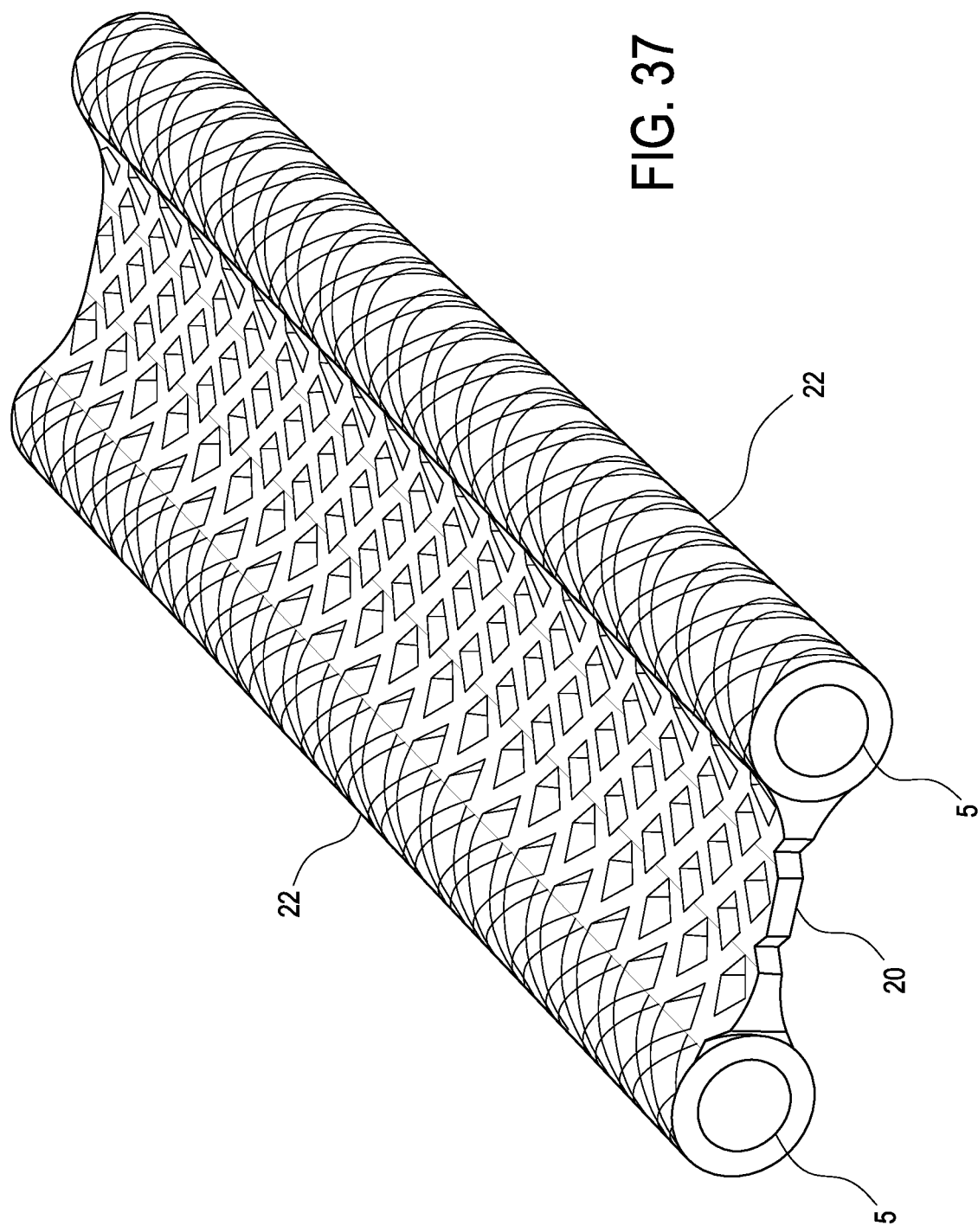
Figure 38:
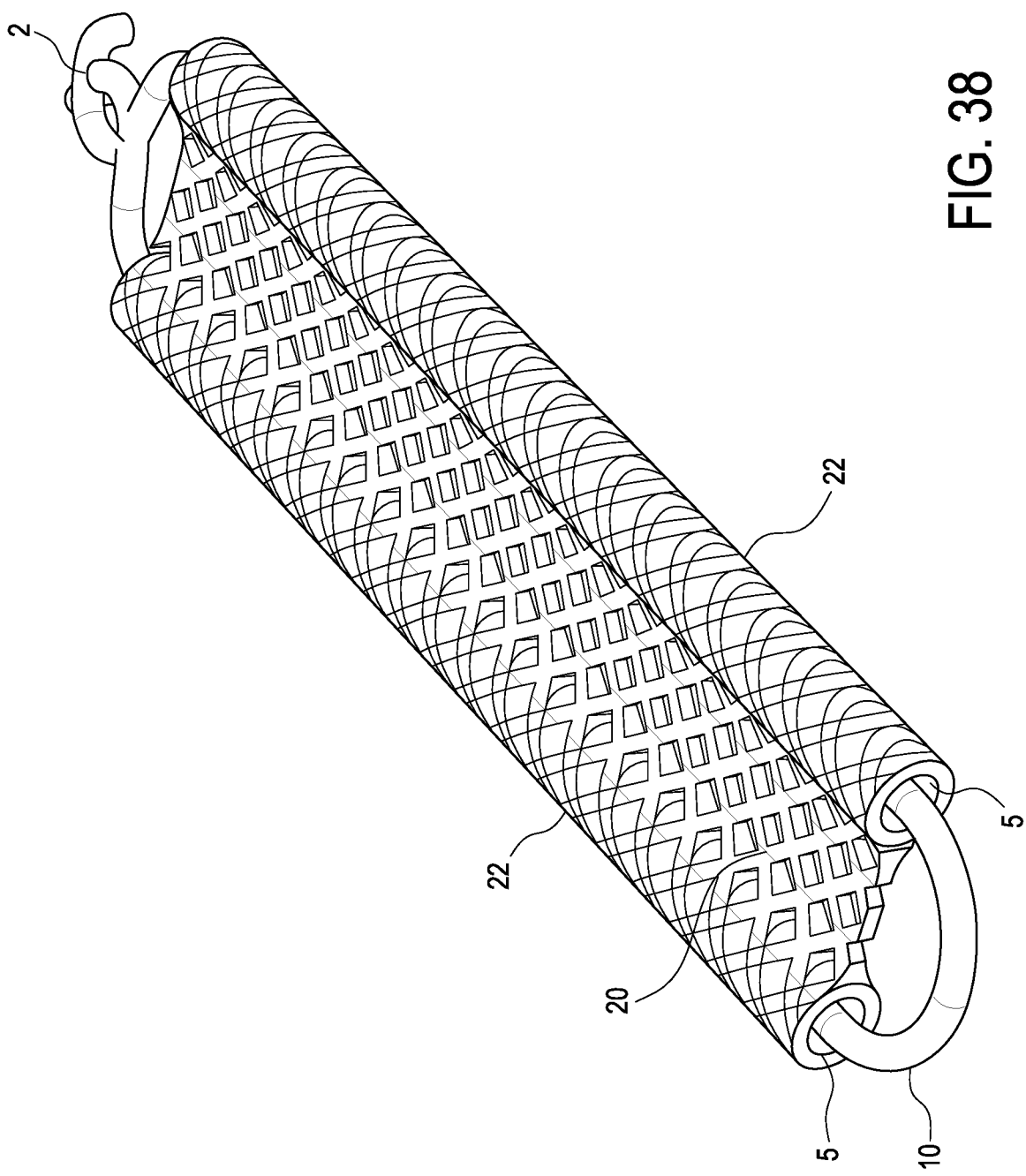
Figure 39:
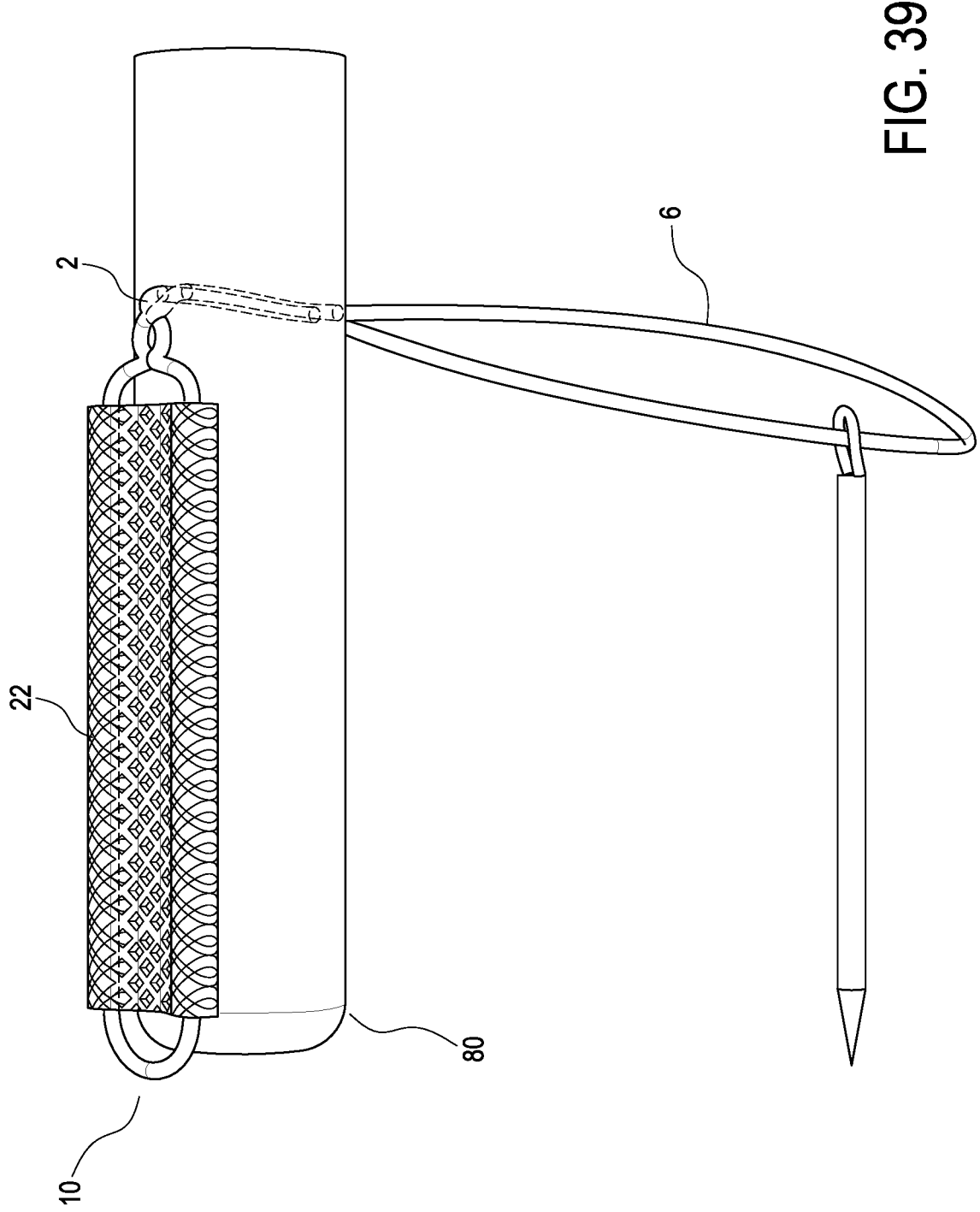

FIG. 33 illustrates a schematic view of a knee 90 undergoing ACL reconstruction employing reinforced graft construct 99 formed according to an embodiment of the present disclosure. Reinforced graft construct 99 is secured within femoral and tibial tunnels (sockets) 91a, 92a, each formed in femur 91 and tibia 92, respectively. The step of securing the reinforced graft construct 99 in at least the tibial and femoral sockets or tunnels can be accomplished by plugging the target tunnel with a synthetic plug, bone plug or screw to contain and secure the reinforced graft construct 99 in the tunnel or, alternatively, by employing knotless lateral fixation using, for example, two knotless fixation devices (such as interference screws or graftbolt-type fixation devices). The fixation devices may be preferably formed of a translucent or transparent polymer material, preferably bioabsorbable materials such as polyglycolic or polylactic acid polymers.

Reference is now made to FIGS. 34-47, which illustrate additional views of the systems and assemblies and associated methods of reinforcing tissue:

Multi-Member Fixation: FIGS. 36-39

A flexible assembly (FIG. 36) comprised of a first and second bore (22) connected with an inner member (20) with a proximal and distal end, where flexible member (10) is routed distally within a first bore and proximally within a second bore, and is connected (2) to the first proximal end of the member creating a loop, Where the bores (22) are hollow (5);

Where the connection is a pierce of both the first and second ends of the flexible member;

Where the extensions of the first and second ends of the flexible member (10) are connected back to each other creating at least one suturing loop;

Where the loop is attached to a needle;

Where the extensions of the first ends of the flexible member (10) is connected back to itself creating a loop;

Where the loop is attached to a needle;

Where the flexible assembly extends to both sides of the graft 80.

Figure 40:
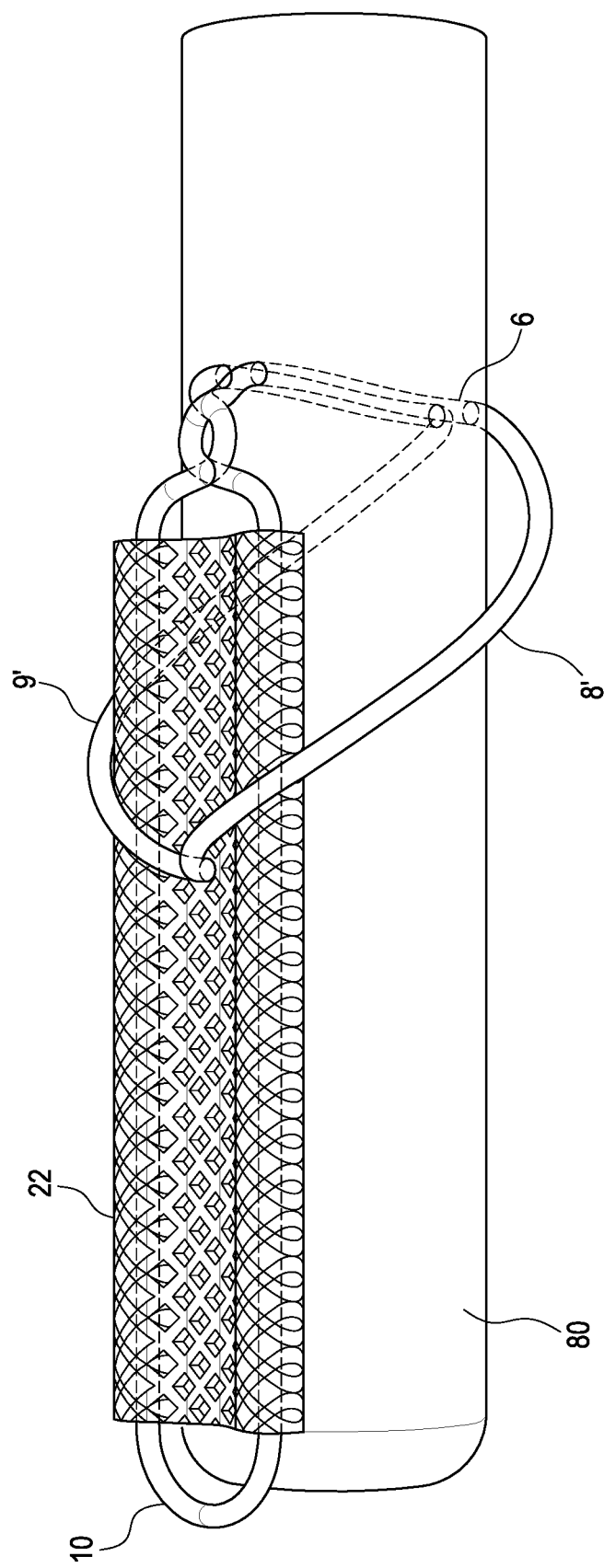
Figure 41:
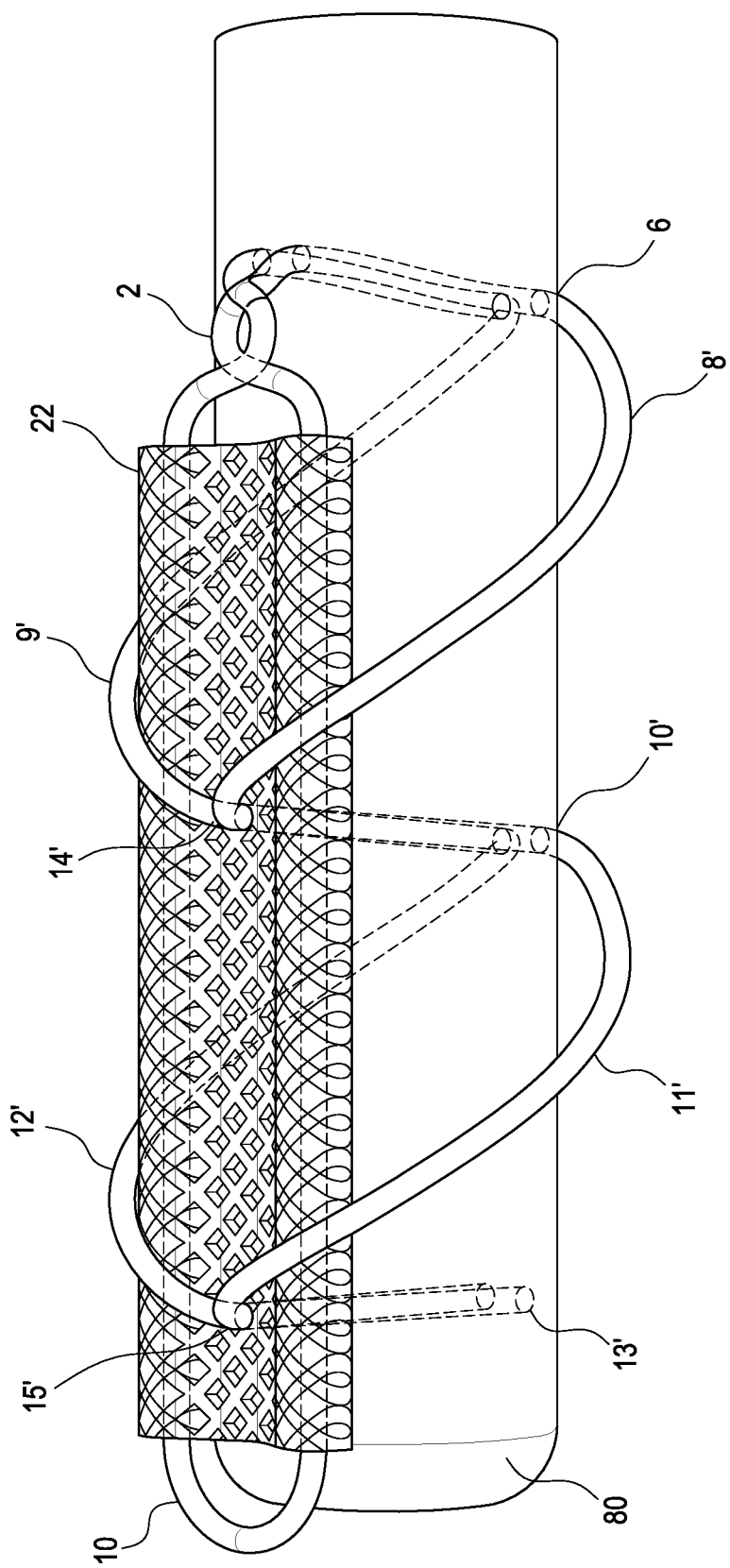

Rip-Stop: FIGS. 40 and 41

A flexible assembly (FIG. 40) comprised of at least one bore (22) wherein the member is placed longitudinally along soft tissue where each extension of the bore reinforces the routing of the flexible member (8'/9' and 11'/12') around the periphery of the flexible assembly and where the inner extension of the bore member (20) reinforces the flexible member centrally (14'/15'), Where the bore member is folded creating the attachment loop for final fixation (27').

Figure 42:
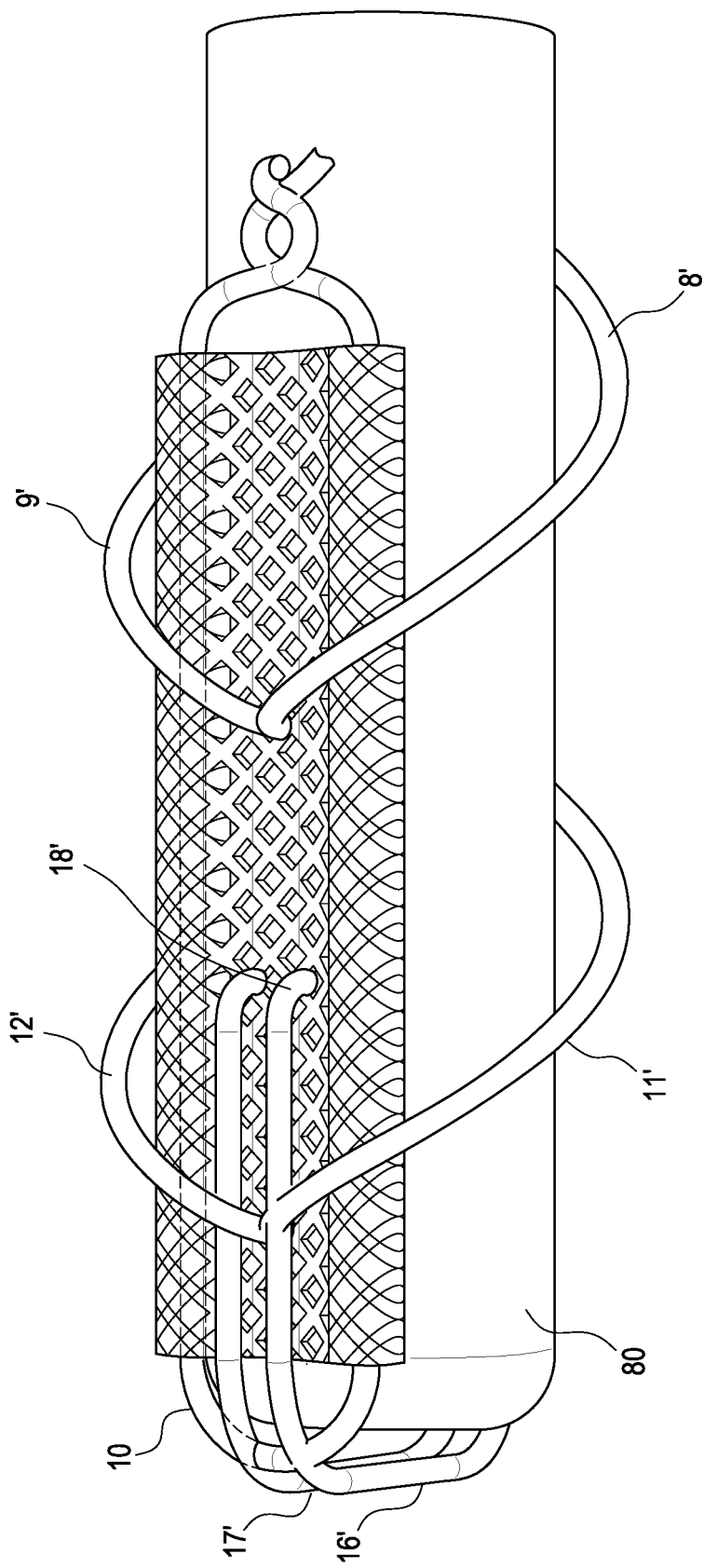
Figure 43:
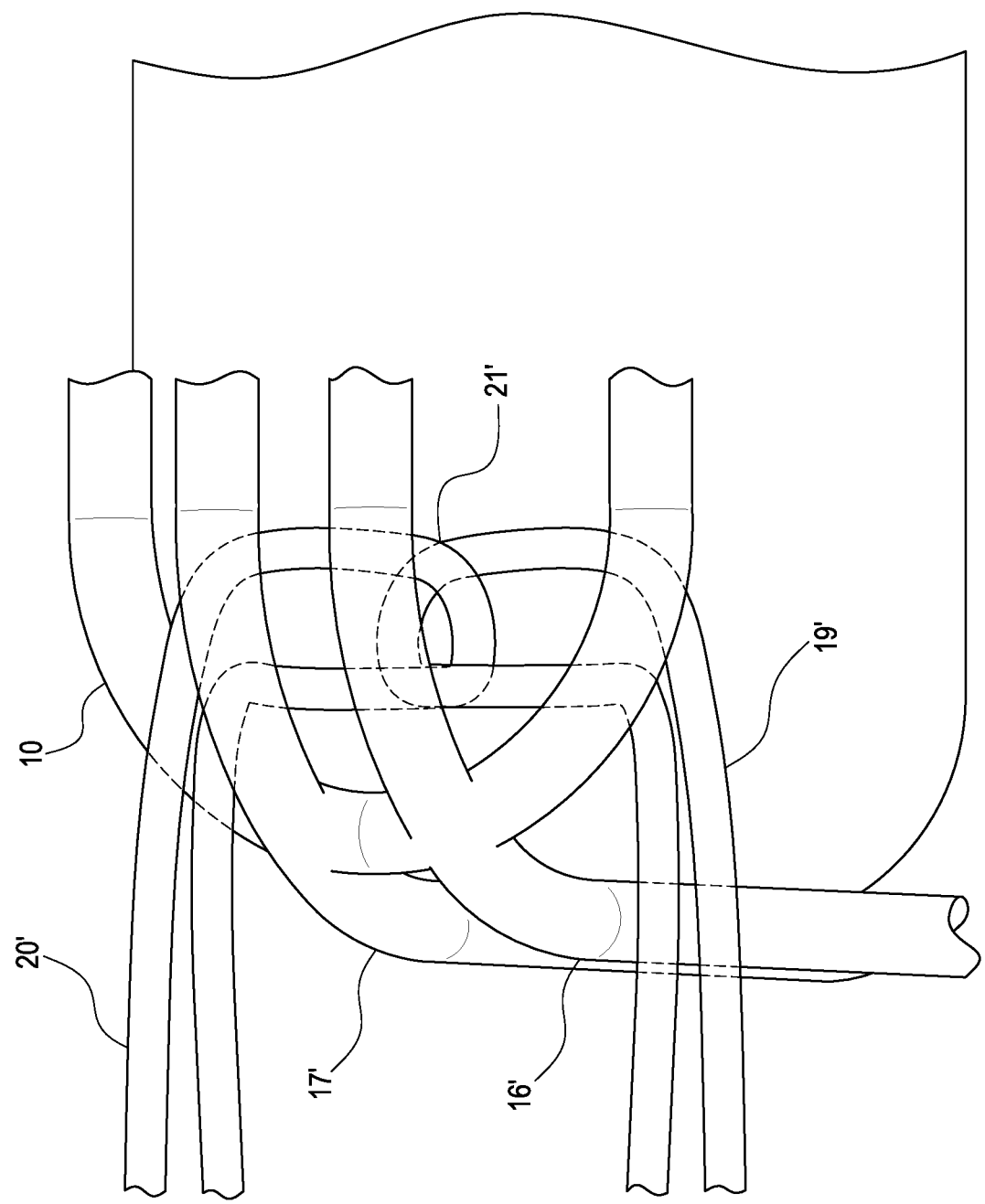
Figure 44:
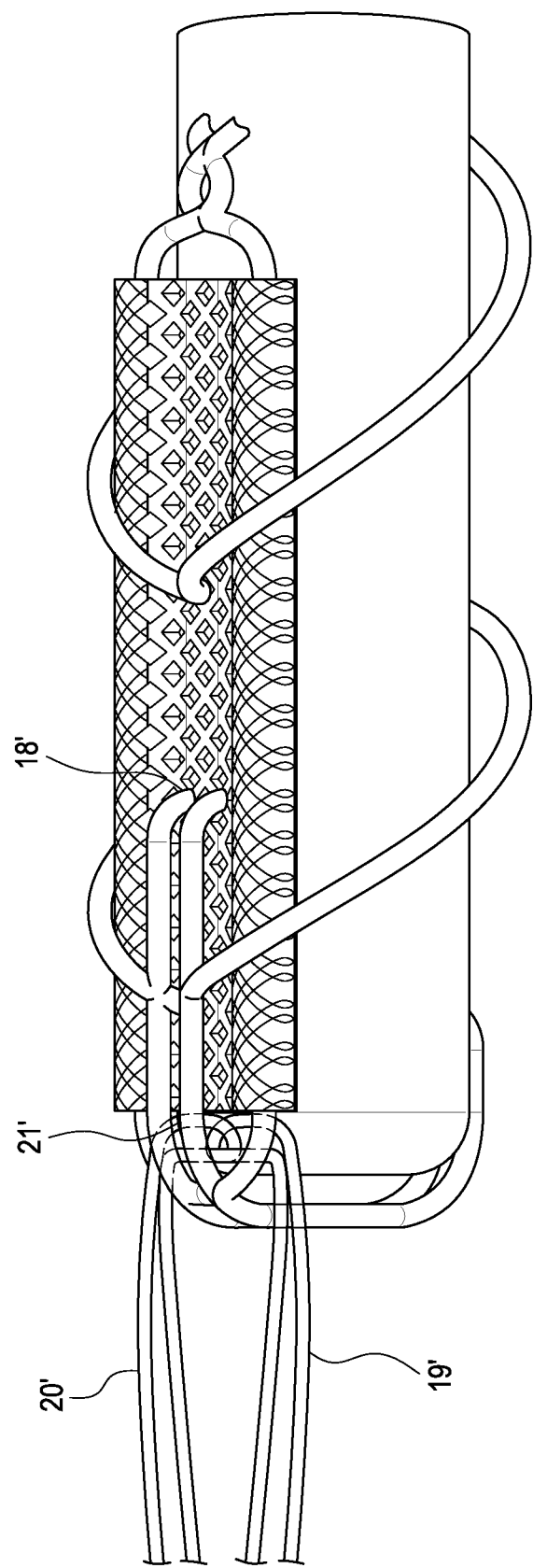

Point Loading: FIGS. 42-44

A flexible member coupled to a flexible assembly where a crossing (27') of the limbs of a flexible member (16'117') and the routing of the flexible member (10) relative to a first and second bore (22) connected with an inner member (20) are joined to an auxiliary construct (19'/20'), where a flexible member (10) is routed distally within a first bore and proximally within a second bore, Where the auxiliary construct is comprised of at least one looped end (19'/20').

Figure 45:
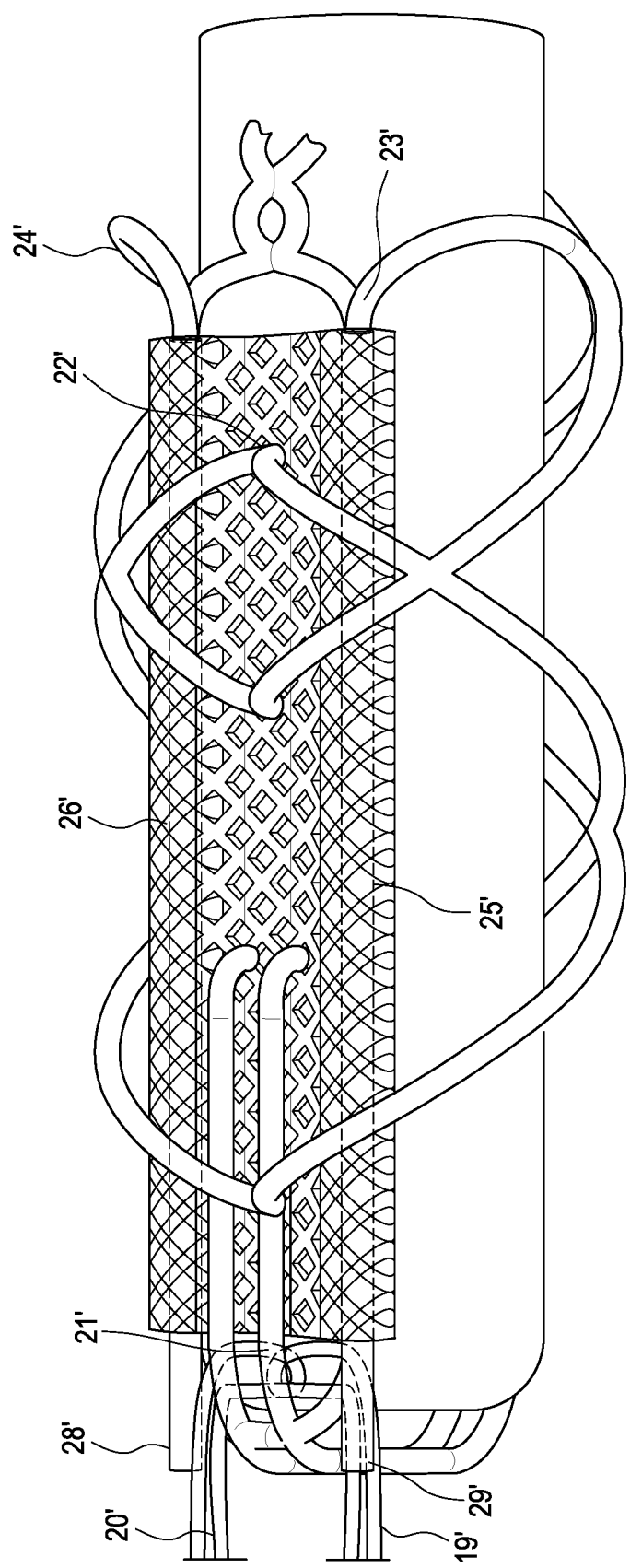
Figure 46:
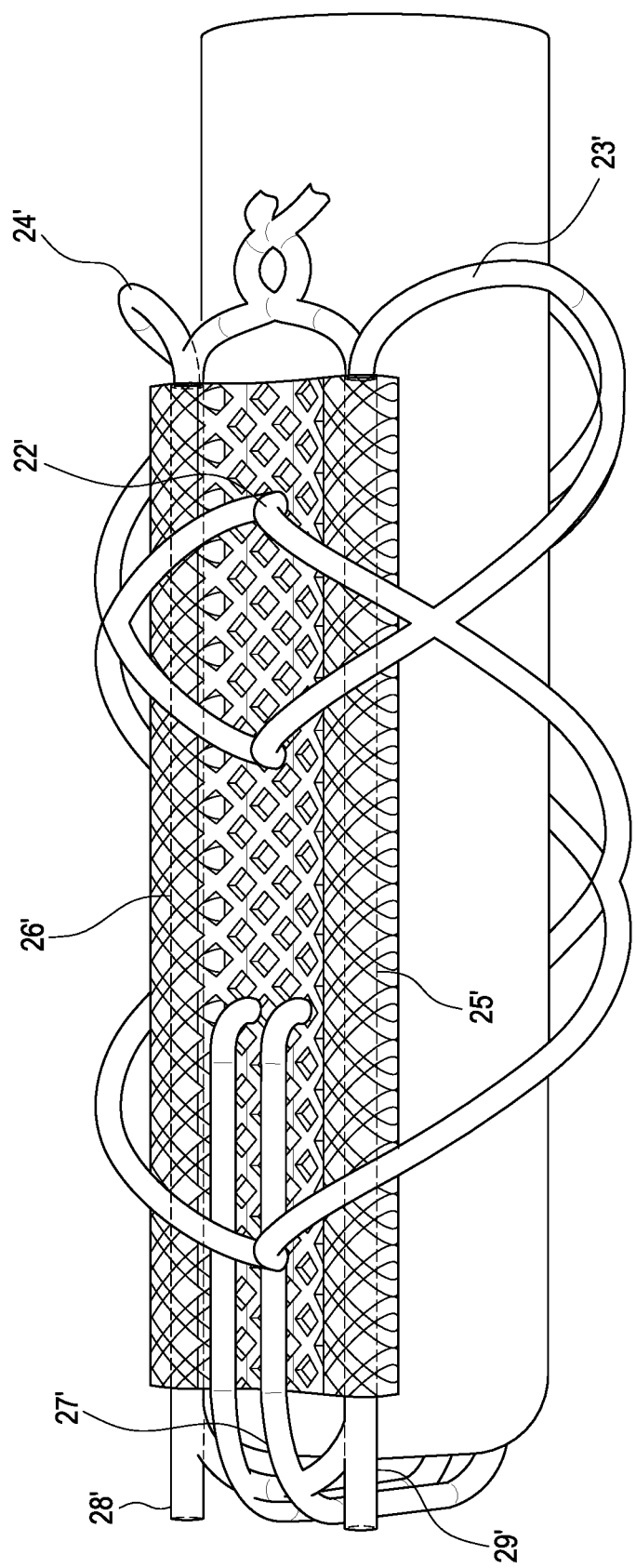
Figure 47:
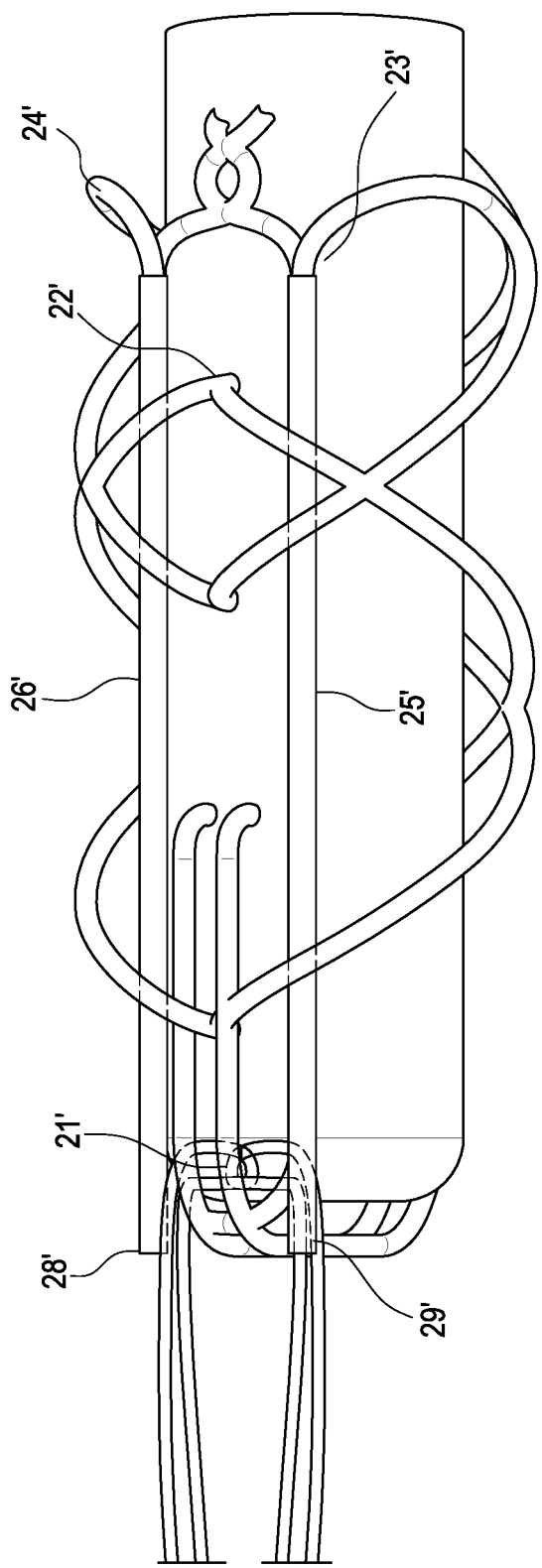

Single-Member Fixation: FIGS. 45-47

A hollow flexible member (10) is placed longitudinally along soft tissue and is connected (2) to the first proximal end of the member creating a loop (2); where the continuation of the first and second strands of the flexible member are connected to tissue. The first and second strands are secured by passing the strands of the flexible member through the inner bore of the longitudinal section of the flexible member (23', 24', 25', 26'), Where each longitudinal bore of the hollow flexible r Member is connected along the bore length (20);

Where the first and second strands are secured up to the loop of the hollow flexible member (28', 29');

Where the connections are bifurcations of a single member.

In an embodiment, graft insertion and fixation can be conducted by employing fixation devices which include a loop with a button (such as the RetroButton®) or an adjustable loop with button (such as the ACL TightRope®). In an embodiment, graft insertion and fixation can be conducted with a suspensory fixation device such as a continuous loop/button construct provided with a button, preferably of titanium alloy, and a continuous loop attached to the button. The button has an oblong configuration and a width that is preferably less than about 1 mm narrower than the width of the drill hole through which the button is inserted and subsequently passed through. The button is provided with an inside eyelet that allows the passage of the continuous loop. In an embodiment, the suture loop can be a single high strength suture such as FiberWire® suture. In an embodiment, the continuous loop can be formed of a plurality of suture strands configured to separate from a single strand to a plurality of strands in a continuous loop. In yet another embodiment, the loop is an adjustable loop (forming a TightRope® ACL construct) which consists of two interconnected, adjustable flexible loops formed by splicing a suture strand in a manner disclosed in U.S. Pat. No. 8,439,976 issued May 14, 2013 and U.S. Pat. No. 8,460,379 issued Jun. 11, 2013, the disclosures of both of which are incorporated by reference in their entireties herein.

The reinforced graft, ligament, or tendon construct 99 can be attached to a continuous loop/button suture construct. Once the whipstitching is completed, the reinforced assembly may be pre-tensioned for use in ACL repair. The type of repair for which the construct is being used for will determine the amount of pre-tensioning, which may be up to 50 pounds.

Although the above method was described using rip-stop suturing, any type of suturing and/or stitching that would attach construct 50 to graft/ligament/tendon 80 could be used. Additionally, the construct 50 attached to the graft/ligament/tendon 80 can include an absorbable suture tape that would resorb away after a length of time in the body.

A knotless, self-locking, tensionable surgical construct 50, 150, 250, 350, 450, 550 includes a reinforcement material 20, 20a, 20b; a flexible coupler 10 attached to the reinforcement material; and at least one eyelet 40a. The eyelet 40a allows the flexible coupler 10 to form a knotless, tensionable, self-locking, adjustable loop having an adjustable perimeter and a splice 44, to lock the flexible coupler 10 after proper graft suturing is completed (self-locking mechanism 144). The reinforcement material 20, 20a, 20b can be suture tape. The flexible coupler 10 can be suture. The eyelet 40a can be part of a shuttle/pull device 40. The construct 50 can be provided with optional holes or eyelets 33, 33a, 33b to facilitate suture passes 76 through the reinforcement material 20, 20a, 20b with a suture passing instrument such as a needle 11. Additional fixation devices 60, 160 such as anchors, buttons, implants, screws, plates, or suture loop/button constructs, among many others, can be attached to the flexible coupler 10 and/or reinforcement material 20, 20a, 20b through loop 13, 13a.

In an embodiment, a surgical construct 50, 150, 250, 350, 450, 550 can include one or more longitudinal open lumens 22, 22a extending along a length of a reinforcement material 20, 20a, 20b in the form of a flat tape 20, 20a, 20b. A surgical construct 50, 150, 250, 350, 450, 550 can include two longitudinal open lumen sutures 22, 22a extending along a length of flat tape 20, 20a, 20b. At least one of the longitudinal open lumens 22, 22a may be a coreless suture 22, 22a. At least one of the longitudinal open lumens 22, 22a houses at least one splice 44 of a knotless construct. A surgical construct 50, 150, 250, 350, 450, 550 can be provided with eyelets or openings 33, 33a, 33b to facilitate suture passes through the tape 20, 20a, 20b. A surgical construct 50, 150, 250, 350, 450, 550 can be knotless, tensionable, adjustable, self-locking, self-cinching. Two or more longitudinal open lumens 22, 22a may converge into a single structure, creating passage for one or more splices 44.

A surgical assembly or system 101, 102, 103 includes a reinforcement material 20, 20a, 20b with a self-locking mechanism 144 (including an eyelet 40a secured to a flexible coupler 10) and a fixation device 60, 160 attached to the reinforcement material 20, 20a, 20b. The fixation device 60, 160 can be an anchor, button, implant, screw, plate, suture loop/button construct, or combinations thereof. The fixation device 60, 160 can be a suspensory fixation device, such as an exemplary TightRope® Attachable Button System (ABS), ACL TightRope® construct, or other button/suture loop construct. The surgical assembly or system may be knotless, tensionable, self-locking, adjustable, self-cinching. The fixation device can be an all-suture soft anchor.

A knotless, tensionable, self-locking, reinforced tissue construct 99 includes a stitched region 77 formed with a piece of material 20, 20a, 20b, and at least one self-locking flexible coupler 10 attached to the piece of material 20, 20a, 20b and to an eyelet 40a, the flexible coupler 10 forming at least one locking splice 44 after graft attachment is completed. The piece of material 20, 20a, 20b is attached/affixed to at least a portion of tissue 80 (graft, ligament, or tendon) to reinforce the tissue 80. The material 20, 20a, 20b can be any reinforcement or reinforcing material 20, 20a, 20b such as suture, tape, weave, ribbon, textile, or mesh that can be attached (sutured) to the tissue. In an embodiment, the material 20, 20a, 20b is a suture tape such as FiberTape® suture tape or a collagen tape, or a combination of these materials. The material may be attached to the tissue by suturing (for example, stitching such as whipstitching) or by any other affixing/attachment techniques, to provide additional fixation when implanted. The reinforced tissue (graft, ligament or tendon) construct 99 can be attached to additional fixation devices 60, 160 for various repairs such as ACL/PCL, Achilles, biceps, meniscus, labrum, patella, single limb, multi limb, cervical cerclage, wound closure, and joint capsule repairs and reconstructions, among many others. Multiple suturing methods may be achieved by integrating the construct in the final repair (e.g., whipstitch, rip-stop, Krackow, baseball, loop and tack, Bunnell, Kessler, Bauer, Strobel, etc.) repairs. Tissue may be also directly attached to a fixation device, for example, a TightRope® construct (or other adjustable loops with button constructs) using the reinforcement material and attachment/suturing technique of the present disclosure.

A method of forming a knotless, self-locking, tensionable, reinforced tissue construct (reinforced biologic construct) comprises: (i) suturing or stitching tissue 80 to a reinforcement material 20, 20a, 20b with at least one flexible coupler 10; and (ii) locking the at least one flexible coupler 10 to the reinforcement material 20, 20a, 20b in a knotless manner. The locking can include forming one or more splices 44. The locking can include forming two or more splices 44 with ends/limbs 10a, 10b of the flexible coupler 10. The splice 44 can be formed with a shuttle/pull device 40. The splice 44 can be housed partially or totally within the reinforcement material 20, 20a, 20b. The reinforcement material 20, 20a, 20b can be a flat over-braided middle suture tape section with two longitudinal open lumens 22, 22a that protect and house splices 44 used to lock the sutures 10 after proper tissue suturing 77 is completed. The reinforced construct 99 can be attached to a fixation device 60, 160 (for example, ACL Tightrope® or other suture loop/button construct) and/or any bone tunnel.

A method of reinforcing tissue 80 comprises: (i) stitching together a reinforcement material 20, 20a, 20b and tissue 80 with a needle 11 and a flexible coupler 10 to form a reinforced tissue construct 99; and (ii) locking the flexible coupler 10 without tying knots. The reinforcement material 20, 20a, 20b can be a tape, a ribbon, a weave, or a mesh, or combination of tape, ribbon, weave or mesh. The reinforcement material 20, 20a, 20b can be suture tape and the flexible coupler 10 can be suture. The reinforcement material 20, 20a, 20b can be provided with a plurality of through-holes, openings, or eyelets 33, 33a, 33b. The stitching can form a rip-stop stitch 77. The locking of the flexible coupler 10 can be conducted by forming at least one splice 44 secured to the reinforcement material 20, 20a, 20b. The at least one splice 44 can be housed fully or partially within a lumen or channel 22, 22a of the reinforcement material 20, 20a, 20b. The at least one splice 44 can be housed fully or partially within a coreless suture 22, 22a of the reinforcement material 20, 20a, 20b. The locking can be conducted by: providing two shuttle/pull devices 40 attached to the reinforcement material 20, 20a, 20b; placing the reinforcement material 20, 20a, 20b on a surface of the tissue 80; forming a series of stitching loops 76 around the tissue 80 and the reinforcement material 20, 20a, 20b with needle 11 and flexible coupler 10; subsequently, passing limbs 10a, 10b of the flexible coupler 10 through a closed loop or eyelet 40a of each of the two shuttle/pull devices 40; and pulling on the shuttle/pull device 40 to pass each limb 10a, 10b through itself and form a splice 44. Tissue 80 may be graft, ligament, or tendon. One or more fixation devices 60, 160 can be attached to the tissue 80 of the reinforced tissue construct 99. The fixation device 60, 160 can be a screw, anchor, button, plate, or any device that allows attachment to loop 13, 13a of flexible coupler 10 of the reinforced tissue construct 99. The fixation device 60, 160 can include at least one continuous, uninterrupted, flexible, adjustable suture loop 56. Forming a plurality of stitching loops 76 can be conducted by passing needle 11 attached to flexible coupler 10, through the reinforcement material 20, 20a, 20b and the tissue 80, to stitch through the tissue 80 and the reinforcement material 20, 20a, 20b, and form rip-stop stitch pattern 77. The reinforcement material 20, 20a, 20b may be bioabsorbable and the reinforced tissue 99 may be an ACL graft.

Methods of ligament reconstruction employing reinforced tissue constructs are also disclosed. An exemplary method comprises: (i) providing a target tunnel 91, 92a for ligament reconstruction; (ii) providing a stitched reinforced tissue construct 99 with at least a reinforced stitched region 77, the reinforced stitched region including a reinforcement (reinforcing) material 20, 20a, 20b located between tissue (tendon/ligament/graft) 80 and the stitching 77; (iii) inserting the stitched tissue construct 99 into the target tunnel 91a, 92a; and (iv) securing the stitched tissue construct 99 in the tunnel 91a, 92a.

The disclosure provides knotless methods and constructs for soft tissue repair and reconstruction. Traditionally, grafts or tendons are stitched and knots are tied with remaining suture limbs. Surgical knots vary in strength and size and contribute to cyclic displacement and lower ultimate loads if tied improperly. A knotless solution (such as the one of the present disclosure) reduces user variation contributing to a stronger and more reproducible repair. Additionally, arthroscopic soft tissue repair and reconstruction is typically completed with the use of a suture passer to pass suture limbs through tissue when knots are tied on top of the reconstructed or repaired soft tissue. The combination (in the present disclosure) of a knotless suturing system with a suture passer provides for faster tissue reduction with a stronger and more reproducible repair. The present disclosure uses splicing coupled with multiple bifurcations (openings or eyelets) to allow needle passages and rip stop technology to be implemented into the final construct. The design of the "Tag" component is novel and includes two longitudinal open lumen sutures extending along the length of the flat over-braided middle suture tape section. The two longitudinal open lumen sutures protect and house the splices that are used to lock the sutures after proper graft suturing is completed. The bifurcations (through-holes or eyelets) allowing for the rip stop technology are not necessary for all embodiments of the device. Additionally, the two longitudinal sutures are not necessary as one-piece construction is possible and can be an effective solution. The two longitudinal sutures can be one element creating passage for the splices, connected at the tip to provide additional strength and construct rigidity. Multiple suturing methods can be achieved with integration of this technology into its final construct (e.g., whipstitch, Krackow, baseball, loop and tack, Bunnell, Kessler, Bauer, Strobel, etc.). In additional embodiments, the technology can be repeated in a serial fashion for wound repair with biologic or other technology incorporation. Possible repair indications include but are not limited to Achilles, biceps, ACL/PCL, meniscus, labrum, patella, single limb, multi limb, any reducing device, cervical cerclage, wound closure, joint capsule, etc.

Reinforcement material 20, 20a, 20b can be formed of any suture, tape, weave, fabric, ribbon, textile, web, or mesh, or any combinations of these materials. Reinforcement material 20, 20a, 20b can be braided or multi-filament suture such as FiberTape® suture tape (as disclosed in U.S. Pat. No. 7,892,256, the disclosure of which is incorporated in its entirety herewith) or collagen tape, or wide "tape like" material, or combinations thereof. Reinforcement material 20, 20a, 20b can be formed of a high strength suture material such as FiberWire® suture, sold by Arthrex, Inc. of Naples, Fla., and described in U.S. Pat. No. 6,716,234, the disclosure of which is incorporated by reference herein. FiberWire® suture is formed of an advanced, high-strength fiber material, namely ultrahigh molecular weight polyethylene (UHMWPE), sold under the tradenames Spectra® (Honeywell International Inc., Colonial Heights, Va.) and Dyneema® (DSM N.V., Heerlen, the Netherlands), braided with at least one other fiber, natural or synthetic, to form lengths of suture material. Reinforcement material 20, 20a, 20b can be formed of any material or combination of materials that can be provided on the ligament, graft, or tendon, along a length thereof, and stitched/sutured to provide additional fixation when the ligament, graft, or tendon is further secured/implanted. The reinforcement material 20, 20a, 20b may be absorbable or non-absorbable.

Reinforcement material 20, 20a, 20b can consist essentially of suture or suture material, or of combination of suture and other materials such as long chain synthetic polymers like polyester and nylon, or materials such as PET, silk nylon or absorbable polymers, or coating materials (such as wax, silk, or silicone products), among many others. These materials augment the strength and pliability of the construct and improve the characteristics and properties of the suture material.

Flexible coupler 10 can be formed of any flexible material and it can be also constructed in a spliced loop. In an embodiment, flexible coupler 10 is formed of a material similar to that of reinforcement material 20, 20a, 20b. In an embodiment, flexible coupler 10 is round suture. In an embodiment, flexible coupler 10 is FiberWire® suture.

Flexible coupler 10 can consist essentially of suture or suture material, or combination of suture and other materials such as long chain synthetic polymers like polyester and nylon, or materials such as PET, silk nylon or absorbable polymers, or coating materials (such as wax, silk, or silicone products), among many others. Flexible coupler 10 can consist of strands with cross-sections of various forms and geometries, including round, oval, rectangular, or flat, among others, or combinations of such forms and geometries. In an embodiment, at least one of flexible coupler 10 and reinforcement material 20, 20a, 20b can be provided as a suture which is braided, knitted or woven.

Flexible coupler 10 and reinforcement material 20, 20a, 20b can be also formed of a stiff material, or combination of stiff and flexible materials, depending on the intended application. Flexible coupler 10 and reinforcement material 20, 20a, 20b can be also coated and/or provided in different colors. In an embodiment, parts (or all) of surgical construct 50, 150, 250, 350, 450, 550 can be coated (partially or totally) with wax (beeswax, petroleum wax, polyethylene wax, or others), silicone (Dow Corning silicone fluid 202A or others), silicone rubbers (Nusil Med 2245, Nusil Med 2174 with a bonding catalyst, or others) PTFE (Teflon, Hostallon, or others), PBA (polybutylate acid), ethyl cellulose (Filodel) or other coatings, to improve lubricity of the suture and/or tape, pliability, handleability or abrasion resistance, for example.

Flexible coupler 10 can be also provided with tinted tracing strands, or otherwise contrast visually with the reinforcement material 20, 20a, 20b of the construct, which remains a plain, solid color, or displays a different tracing pattern, for example. Various structural elements of surgical construct 50, 150, 250, 350, 450, 550 may be visually coded, making identification and handling of the suture legs simpler. Easy identification of suture in sin, is advantageous in surgical procedures.

The term "high strength suture" is defined as any elongated flexible member, the choice of material and size being dependent upon the particular application. For the purposes of illustration and without limitation, the term "suture" as used herein may be a cable, filament, thread, wire, fabric, or any other flexible member suitable for tissue fixation in the body.

What is claimed is:
1. A reinforced tissue construct, comprising:
a reinforcement material adapted to attach to a tissue surface of a tissue, wherein the reinforcement material includes two longitudinal channels or open lumens extending longitudinally relative to the reinforcement material and on opposing sides of the reinforcement material; and a flexible coupler knotlessly attached to the reinforcement material, wherein the flexible coupler forms a series of stitching loops around the tissue and the reinforcement material.

2. The reinforced tissue construct of claim 1, wherein the flexible coupler is knotlessly attached to the reinforcement material through at least one splice or pierce.

3. The reinforced tissue construct of claim 2, wherein the at least one splice is located at least partially within one of two longitudinal channels or open lumens of the reinforcement material.

4. The reinforced tissue construct of claim 1, wherein the reinforcement material is a tape, a ribbon, a weave, a mesh, or combination of tape, ribbon, weave, or mesh.

5. The reinforced tissue construct of claim 1, wherein the tissue is a graft, a ligament, or a tendon.

* * * * *